US008859672B2

(12) United States Patent
Peters

(10) Patent No.: US 8,859,672 B2
(45) Date of Patent: *Oct. 14, 2014

(54) POLY(ARYLENE ETHER)-POLY(HYDROXY ETHER) BLOCK COPOLYMER AND METHOD OF MAKING

(75) Inventor: Edward Norman Peters, Lenox, MA (US)

(73) Assignee: Sabic Global Technologies B.V. (NL)

(*) Notice: Subject to any disclaimer, the term of this patent is extended or adjusted under 35 U.S.C. 154(b) by 484 days.

This patent is subject to a terminal disclaimer.

(21) Appl. No.: 13/169,122

(22) Filed: Jun. 27, 2011

(65) Prior Publication Data

US 2012/0329939 A1 Dec. 27, 2012

(51) Int. Cl.
*C08G 59/04* (2006.01)
*C08G 59/06* (2006.01)
(Continued)

(52) U.S. Cl.
CPC ............ *C08G 65/48* (2013.01); *C08G 65/4075* (2013.01); *C08G 65/4025* (2013.01); *C08G 65/38* (2013.01); *C08G 65/4056* (2013.01); *C08G 65/42* (2013.01); *C08K 7/14* (2013.01); *C08L 71/10* (2013.01); *C08G 65/34* (2013.01); *C08G 65/4012* (2013.01); *C08L 71/126* (2013.01); *C08G 65/4031* (2013.01); *C08L 71/12* (2013.01); *C08G 2650/56* (2013.01); *C08G 65/4043* (2013.01); *C08G 65/4018* (2013.01); *C08G 65/4006* (2013.01); *C08L 71/123* (2013.01); *C08G 65/40* (2013.01); *C08G 65/44* (2013.01)
USPC .............. 524/505; 525/88; 525/107; 525/109

(58) Field of Classification Search
CPC ........ C08G 65/34; C08G 65/38; C08G 65/40; C08G 65/4006; C08G 65/4012; C08G 65/4018; C08G 65/4025; C08G 65/4031; C08G 65/4043; C08G 65/4056; C08G 65/4075; C08G 65/42; C08G 65/44; C08G 2650/56; C08L 71/10; C08L 71/12; C08L 71/123; C08L 71/126
USPC ............................. 524/505; 525/88, 107, 109
See application file for complete search history.

(56) References Cited

U.S. PATENT DOCUMENTS 3,306,874 A 2/1967 Hay
3,409,581 A 11/1968 Hagan, Jr.
(Continued)

FOREIGN PATENT DOCUMENTS

PL 164813 B1 6/1992
WO 9532243 11/1995
WO 2009104107 A1 8/2009

OTHER PUBLICATIONS

Chiang et al., "Polymer blends of polyamide-6 (PA6) and poly(phenylene ether) (PPE) compatibilized by a multifuncational epoxy coupler", Journal of Polymber Science: Part B: Polymer Physics, 1998, vol. 36, No. 11, pp. 1805-1819, Abstract only, 3 pages.

(Continued)

*Primary Examiner* — Ling Choi
*Assistant Examiner* — David L Miller
(74) *Attorney, Agent, or Firm* — Cantor Colburn LLP

(57) ABSTRACT

A poly(arylene ether)-poly(hydroxy ether) block copolymer includes at least one poly(hydroxy ether) block and at least one poly(arylene ether) block, and the mole ratio of poly(hydroxy ether) blocks to poly(arylene ether) blocks is 0.95:1 to about 1.00:1. The poly(arylene ether)-poly(hydroxy ether) block copolymer can be prepared by reacting a telechelic poly(arylene ether) having terminal hydroxyl groups with a telechelic poly(hydroxy ether) epoxy resin having terminal epoxy groups, wherein the mole ratio of the telechelic poly(hydroxy ether) to the telechelic poly(arylene ether) is 0.95:1 to 1.00:1. The poly(arylene ether)-poly(hydroxy ether) block copolymer can be shaped into an article by extrusion, thermoforming, or molding, and is a compatibilizing agent for non-polar and polar polymers.

32 Claims, 4 Drawing Sheets

(51) Int. Cl.
| | |
|---|---|
| C08G 65/48 | (2006.01) |
| C08K 7/14 | (2006.01) |
| C08L 71/10 | (2006.01) |
| C08G 65/40 | (2006.01) |
| C08G 65/38 | (2006.01) |
| C08G 65/42 | (2006.01) |
| C08G 65/34 | (2006.01) |
| C08L 71/12 | (2006.01) |
| C08G 65/44 | (2006.01) |

(56) References Cited

U.S. PATENT DOCUMENTS

| | | | |
|---|---|---|---|
| 3,631,126 | A | 12/1971 | Snodgrass et al. |
| 4,853,423 | A | 8/1989 | Walles et al. |
| 4,912,172 | A | 3/1990 | Hallgren et al. |
| 5,108,842 | A | 4/1992 | Hallgren et al. |
| 5,141,791 | A | 8/1992 | Chao et al. |
| 5,266,673 | A * | 11/1993 | Tsukahara et al. ............ 528/212 |
| 5,916,496 | A | 6/1999 | Weber |
| 6,159,264 | | 12/2000 | Holl |
| 6,194,496 | B1 | 2/2001 | Weber et al. |
| 6,770,691 | B2 | 8/2004 | Yeager |
| 7,671,167 | B2 | 3/2010 | Carrillo et al. |
| 2005/0075472 | A1 | 4/2005 | Yeager et al. |
| 2005/0154130 | A1 | 7/2005 | Adedeji et al. |
| 2006/0079642 | A1 | 4/2006 | Adedeji et al. |
| 2006/0135695 | A1 | 6/2006 | Guo et al. |
| 2007/0238831 | A1 | 10/2007 | Klei et al. |
| 2007/0287801 | A1 | 12/2007 | Davis et al. |
| 2012/0029129 | A1 | 2/2012 | Ting et al. |

OTHER PUBLICATIONS

International Search Report for International Application No. PCT/US2012/069339, International Application Filing Date Dec. 13, 2012; Date of Mailing Apr. 25, 2013, 7 pages.
Written Opinion for International Application No. PCT/US2012/069339, International Application Filing Date Dec. 13, 2012; Date of Mailing Apr. 25, 2013, 4 pages.
International Search Report for International Application No. PCT/US2012/069340, International Application Filing Date Dec. 13, 2012; Date of Mailing Apr. 25, 2013, 7 pages.
Written Opinion for International Application No. PCT/US2012/069340, International Application Filing Dec. 13, 2012; Date of Mailing Apr. 25, 2013, 5 pages.
Co-Pending U.S. Appl. No. 13/756,692, filed Feb. 1, 2013.
Co-Pending U.S. Appl. No. 13/446,162, filed Apr. 13, 2012.
Chao et al.; "Poly(2,6-Dimethyl-1,4-Phenylene Ether) (PPE) Redistribution and Its Significance in the Preparation of PPE/Epoxy Laminate"; Reactive Polymers, 15; pp. 9-23; (1991).
D.E.R. 317 Liquid Epoxy Resin, DOW Product Information Sheet, downloaded from http://msdssearch.dow.com/PublishedLiteratureDOWCOM/dh_01e8/0901b803801e8ef1.pdf?filepath=epoxy/pdfs/noreg/296-01533.pdf&fromPage=GetDoc on Sep. 14, 2011, 3 pages.
D.E.R. 667E Solid Epoxy Resin, DOW Product Information Sheet, downloaded from http://msdssearch.dow.com/PublishedLiteratureDOWCOM/dh_02db/0901b803802db68b.pdf?filepath=epoxy/pdfs/noreg/296-01489.pdf&fromPage=GetDoc on Sep. 14, 2011, 3 pages.
D.E.R. 668-20 Solid Epoxy Resin, DOW Product Information, downloaded from http://msdssearch.dow.com/PublishedLiteratureDOWCOM/dh_02db/0901b803802db6a0.pdf?filepath=epoxy/pdfs/noreg/296-01479.pdf&fromPage=GetDoc on Sep. 14, 2011, 3 pages.
DOW Answer Center, "DOW Epoxy—Type Definition", last updated Aug. 13, 2010, 1 page, retrieved from http://dow-answer.custhelp.com/app/answers/detail/a_id/9928/~/dow-epoxy---type-definition on Mar. 7, 2011.
EPON Resin 1001F, Technical Data Sheet, Re-issued Sep. 2007, downloaded from http://www.hexion.com/Products/TechnicalDataSheet.aspx?id=4017, on Sep. 14, 2011, 4 pages.
EPON Resin 1002F, Technical Data Sheet, Re-issued Sep. 2007, downloaded from http://www.hexion.com/Products/TechnicalDataSheet.aspx?id=4025 Sep. 14, 2011, 4 pages.
EPON Resin 1007F, Technical Data Sheet, Re-issued Sep. 2007, downloaded from http://www.hexion.com/Products/TechnicalDataSheet.aspx?id=4029 on Sep. 14, 2011, 4 pages.
Iribarren, et al.; "Phenoxy Resin: Characterization, Solution Properties, and Inverse Gas Chromatography Investigation of Its Potential Miscibility with Other Polymers"; Journal of Applied Science; 37; pp. 3459-3470; (1989).
PPO* Resin 640, SABIC Data Sheet, downloaded from http://kbam.geampod.com/KBAM/Reflection/Assets/20423.pdf, on Sep. 14, 2011, 1 page.
PPO* Resin SA90, SABIC Data Sheet, downloaded from http://www.sabic-ip.com/gepapp/eng/weather/weatherhtml?sltRegionList=1002002000&sltPrd=1002003013&sltGrd=1002041836&sltUnit=0&sltModule=DATASHEETS&sltVersion=Internet&sltType=Online, on Sep. 14, 2011, 1 page.
PPO* SA90-100, SABIC Data Sheet, downloaded from http://www.sabic-ip.com/resins/DataSheet/Internet/HTML1002002000_1002003013_1002040979_Metric.htm, on Mar. 7, 2011, 2 pages.
Reinking, et al.: "Polyhydroxyethers. I. Effect of Structure on Properties of High Molecular Weight Polymers from Dihydric Phenols and Epichlorodydrin"; Journal of Applied Polymer Science, vol. 7, 1963, pp. 235-2144.
Rejdych et al., "Synthesis and properties of block diepoxides oligo(xylylen oxy)diepoxides", Polymers—Plastic Macromolecular 40, No. 2, 1995, 12 pages, English Translation.
Robeson, et al.; "Miscibility of the Poly(hydroxy ether) of Bisphenol A with Water-Soluble Polyethers"; Macromolecules 14, 1981, pp. 1644-1650.
Uriarte, et al., "Miscibility and Phase Separation in Poly(vinyl methylether)/Poly(bisphenol A hydroxy ether) Blends", Macromolecules 20, 1987, pp. 3038-3042.
D.E.R. 6155 Solid Epoxy Resin, DOW Product Information, downloaded from http://msdssearch.dow.com/PublishedLiteratureDOWCOM/dh_02db/0901b803802db6cb.pdf?filepath=epoxy/pdfs/noreg/296-01592.pdf&fromPage=GetDoc, on Sep. 14, 2011, 3 pages.
Co-Pending U.S. Appl. No. 13/415,016, submitted to the USPTO on Mar. 8, 2012.
Christiansen et al., "The Phase Behavior of Ternary Blends Containing Polycarbonate, Phenoxy, and Polycaprolactone", Journal of Applied Polymer Science, vol. 34, pp. 537-548, 1987.
Coleman et al., "FTIR studies of polymer blends containing the poly(hydroxy ether of bisphenol A) and pol(e-caprolactone)", Polymer, vol. 24, pp. 251-256, 1983.
Dekkers et al., Morphology and deformation behaviour of toughened blends of poly(butylene terephthalate), polycarbonate and poly(phenylene ether), Polymer, vol. 32, No. 12, pp. 2150-2153, 1991.
Eguiazabal et al., "Glass transition temperatures in blends of poly(N-vinyl-2-pyrrolidone) with a copolymer of bisphenol A and epichlorohydrin or with poly(vinyl butyral)", Makromolekulare Chemie, 185, pp. 1761-1766, 1984.
Harris et al., "Miscible Binary Blends Containing the Polyhydroxy Ether of Bisphenol-A and Various Aliphatic Polyesters", Journal of Applied Polymer Sciences, vol. 27, 839-855, 1982.
Hobbs et al., "Reactive Processing of Blends of Functionalized Poly(2,6-dimethyl-1,4 phenylene oxide) and Poly (butylene terephthalate)", Polymer Preprints, vol. 33, No. 2, pp. 614-615, 1992.
Jang et al., "Performance Improvement of Glass-Fiber-Reinforced Polystyrene Composite Using a Surface Modifier. II. Mechanical Properties of Composites", Journal of Applied Polymer Science, vol. 59, pp. 2069-2077, 1996.
Liu et al., "In Situ Compatibilization of PBT/PPO Blends", European Polymer Journal, vol. 32, No. 1, pp. 91-99, 1996.
Lo et al., "Reactive Compatibilization of PET and PPE Blends of Epoxy Couplers", Journal of Applied Polymer Science, 65, pp. 739-753, 1997.

(56) References Cited

OTHER PUBLICATIONS

Peters et al. "Engineering Thermoplastics", Applied Polymer Science, pp. 177-196, 2000.
Peters, "Introduction to Polymer Characterization", Chapter 1—Comprehensive Desk Reference of Polymer Characterization and Analysis, pp. 3-29, 2003.
Peters, "Polyphenylene Ether (PPE) Blends and Alloys", Chapter 9—Engineering Plastics Handbook, pp. 181-220, 2006.
Peters, "Poly(2,6-dimethyl-1,4-phenylene oxide)", Polymer Data Handbook, 2nd Edition, pp. 534-537, 2009.
Robeson et al., "Miscible Blends of Poly(butylene terephthalate) and the Polyhydroxyether of Bisphenol A", Journal of Applied Polymer Science, vol. 23, pp. 645-659, 1979.
Singh et al., "The Miscibility of Polyethersulfone with Phenoxy Resin", Journal of Macromolecular Science—Physics, B25(1&2), pp. 65-87, 1986.
Yamamoto, "With block *graft copolymer improvement and compatibilization of polymer", J. Jap. Rup. Soc., vol. 62, 14 pages, 1990, Machine Translation.
Lee et al., New Linear Polymers, "Phenoxy Resins" and "Properties of Adhesive Compounds", 1967, McGraw-Hill Inc. Book Company New York, 5 pages.
JP 05-125234 Abstract; Application No. 03-292613; filed Nov. 8, 1991; "Thermoplastic Resin Composition"; 1 page.
International Search Report and Written Opinion; International Application No. PCT/US2012/040647; International Filing Date Jun. 4, 2012; Date of Mailing Dec. 26, 2012; 8 pages.
International Search Report for International Application No. PCT/US2014/013313, Application Filing Date Jan. 28, 2014, Date of Mailing May 19, 2014, 5 pages.
Written Opinion for International Application No. PCT/US2014/013313, Application Filing Date Jan. 28, 2014, Date of Mailing May 19, 2014, 5 pages.

\* cited by examiner

POLY(ARYLENE ETHER)-POLY(HYDROXY ETHER) BLOCK COPOLYMER AND METHOD OF MAKING

BACKGROUND OF THE INVENTION

Poly(hydroxy ether)s, or phenoxy resins, are linear polymers typically prepared by copolymerization of 2,2-bis(4 hydroxyphenyl)propane (bisphenol A) with 2,2-bis(4-hydroxyphenyl)propane-epichlorohydrin polymers (epoxy resins). Phenoxy resins contain about 6 percent by weight secondary alcohol groups.

Phenoxy resins are used to enhance the properties of coating, adhesive, ink, composite, fiber, and plastic compositions. The pendant hydroxyl groups and backbone ether linkages promote wetting and bonding to polar substrates, pigments, and fillers. The addition of phenoxy resin to thermoplastics can help control process rheology in extrusion, molding, and film forming operations. The amorphous nature of phenoxy resins can be helpful in controlling the crystallization kinetics of thermoplastic materials.

Phenoxy resin has a solubility parameter of 10.68, which gives it excellent compatibility with polar polymers, such as polyesters, polycarbonates, polyamides, and polyurethanes. However, phenoxy resins have low compatibility with polystyrene, poly(arylene ether), polyolefins, (meth)acrylics and other non-polar polymers. The low compatibility of phenoxy resins with non-polar polymers limits their usefulness as additives for non-polar polymers, and also limits their usefulness as compatibilizing agents for blends of polar and non-polar polymers.

Despite the useful properties of phenoxy resins, there remains a need in the art for a material that maintains the advantageous properties of phenoxy resins, while having compatibility with both non-polar and polar polymers, so that it can be used in either. There also remains a need in the art for a material that can serve as a compatibilizing agent for blends of non-polar and polar polymers.

BRIEF DESCRIPTION OF EMBODIMENTS OF THE INVENTION

One embodiment is a poly(arylene ether)-poly(hydroxy ether) block copolymer comprising: at least one poly(hydroxy ether) block, and at least one poly(arylene ether) block; wherein the mole ratio of poly(hydroxy ether) blocks to poly(arylene ether) blocks is 0.95:1 to 1.00:1.

Another embodiment is a poly(arylene ether)-poly(hydroxy ether) block copolymer comprising: at least one poly(hydroxy ether) block, and at least one poly(arylene ether) block, wherein the poly(arylene ether)-poly(hydroxy ether) block copolymer has a number average molecular weight of about 5,000 to about 50,000 atomic mass units.

Another embodiment is a method for forming an article comprising shaping the poly(arylene ether)-poly(hydroxy ether) block copolymer of either of the two preceding paragraphs by extrusion, thermoforming, or molding.

Another embodiment is a composition comprising the poly(arylene ether)-poly(hydroxy ether) block copolymer of claim 1, and a non-polar polymer selected from the group consisting of poly(arylene ether)s, poly(alkenyl aromatic)s, block copolymers of alkenyl aromatic compounds and conjugated dienes, hydrogenated block copolymers of alkenyl aromatic compounds and conjugated dienes, and combinations thereof.

Another embodiment is a method for forming a composition comprising melt-blending or melt-kneading the poly(arylene ether)-poly(hydroxy ether) block copolymer and the non-polar polymer.

Another embodiment is a method of making a poly(arylene ether)-poly(hydroxy ether) block copolymer, comprising: reacting a telechelic poly(arylene ether) having terminal hydroxyl groups with a telechelic poly(hydroxy ether) epoxy resin having terminal epoxy groups; wherein the mole ratio of the telechelic poly(hydroxy ether) to the telechelic poly(arylene ether) is 0.95:1 to 1.00:1.

Another embodiment is a poly(arylene ether)-poly(hydroxy ether) block copolymer prepared by the method of the preceding paragraph.

These and other embodiments are described in detail below.

DETAILED DESCRIPTION OF THE INVENTION

Figure 1:
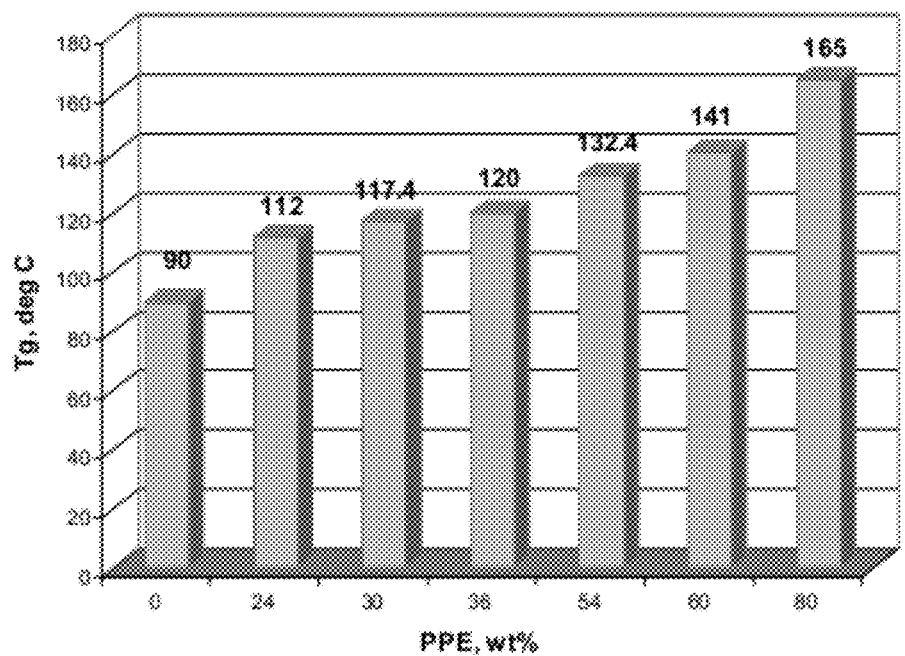
FIG. 1 is a bar chart depicting glass transition temperature ($T_g$) as a function of weight percent poly(arylene ether) block in the poly(arylene ether)-poly(hydroxy ether) block copolymer.

The present inventor has prepared linear thermoplastic poly(arylene ether)-poly(hydroxy ether) block copolymers having high molecular weight and low epoxy content. The poly(arylene ether)-poly(hydroxy ether) block copolymers have good melt stability, in part due to their low epoxy content. It has been found that the poly(arylene ether)-poly(hydroxy ether) block copolymers can be melt extruded and injection molded. The poly(arylene ether)-poly(hydroxy ether) block copolymer exhibits several improved properties over phenoxy resins, such as higher glass transition temperature, higher heat distortion temperature, lower density, lower moisture uptake, and higher flexural modulus and flexural stress at break. The poly(arylene ether)-poly(hydroxy ether) block copolymer also has lower density than phenoxy resin. With its higher glass transition and heat distortion temperatures as compared to phenoxy resins, poly(arylene ether)-poly(hydroxy ether) block copolymer can be used in applications where higher temperatures are encountered. With its lower density, more articles can be molded per unit weight of poly(arylene ether)-poly(hydroxy ether) block copolymer compared to phenoxy resin, which reduces cost for the end-user. Moreover, with its lower density, parts formed from poly(arylene ether)-poly(hydroxy ether) block copolymer have reduced weight compared to parts molded from phenoxy resin, which will improve the fuel economy of vehicles comprising the parts.

The present inventor has also determined that the poly(arylene ether)-poly(hydroxy ether) block copolymers have improved compatibility with non-polar polymers such as polystyrene and poly(arylene ether), as compared to phenoxy resins. Poly(arylene ether)-poly(hydroxy ether) block copolymers can therefore be used in blends with polystyrene and poly(arylene ether) where phenoxy resins are unsuitable. The poly(arylene ether)-poly(hydroxy ether) block copolymer can also be used as a compatibilizer for blends of non-polar polymers such as polystyrene and poly(arylene ether) with polar polymers, such as polyesters, poly(ethylene-vinyl acetate), poly(ethylene-ethyl acrylate), poly(vinyl acetate), poly(vinyl alcohol), and combinations thereof. In some embodiments, the polar polymer is a polyester selected from the group consisting of poly(ethylene terephthalate), poly(trimethylene terephthalate), poly(butylene terephthalate), poly(lactic acid), and combinations thereof. The poly(arylene ether)-poly(hydroxy ether) block copolymer improves interfacial adhesion between non-polar polymer and polar polymer phases above and below the glass transition temperatures of the phases. Below the glass transition temperature, notched Izod impact strength is improved due to the reduced likelihood of delamination of the non-polar and polar polymer phases under impact forces. Above the glass transition temperature, melt processability is improved during extrusion and molding due to reduced likelihood of delamination of the non-polar and polar polymer phases under the shear forces present in extrusion and molding.

In some embodiments, the poly(arylene ether)-poly(hydroxy ether) block copolymer comprises at least one poly(hydroxy ether) block, and at least one poly(arylene ether) block, and the mole ratio of poly(hydroxy ether) blocks to poly(arylene ether) blocks is 0.95:1 to 1.00:1.

The poly(arylene ether) blocks are derived from a telechelic poly(arylene ether) having terminal phenolic hydroxy groups. A "phenolic hydroxyl group" is a hydroxyl group bonded to a substituted or unsubstituted benzene ring. The term "telechelic" is used to describe a linear polymer in which the two terminal end groups of the polymer chain have the same functionality. In some embodiments, the poly(arylene ether) block has the structure

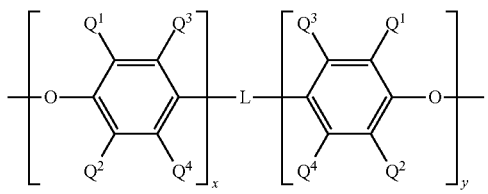

wherein $Q^1$ and $Q^2$ are identical within each arylene ether unit and selected from the group consisting of halogen, unsubstituted or substituted $C_1$-$C_{12}$, hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, specifically 0 to about 20, more specifically 0 to about 15, still more specifically 0 to about 10, even more specifically 0 to about 8, with the proviso that the sum of x and y is at least 2, specifically at least 3, more specifically at least 4; and L has the structure

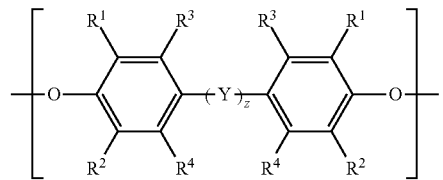

wherein each occurrence of $R^1$ and $R^2$ and $R^3$ and $R^4$ is independently selected from the group consisting of hydrogen, halogen, unsubstituted or substituted $C_1$-$C_{12}$, hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

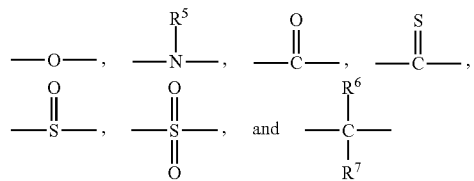

wherein each occurrence of $R^5$ is independently selected from the group consisting of hydrogen and $C_1$-$C_{12}$, hydrocarbyl, and each occurrence of $R^6$ and $R^7$ is independently selected from the group consisting of hydrogen, $C_1$-$C_{12}$, hydrocarbyl, and $C_1$-$C_6$ hydrocarbylene wherein $R^6$ and $R^7$ collectively form a $C_4$-$C_{12}$ alkylene group. As used herein, the term "hydrocarbyl", whether used by itself, or as a prefix, suffix, or fragment of another term, refers to a residue that contains carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl residue, when so stated however, may contain heteroatoms over and above the carbon and hydrogen members of the substituent residue. Thus, when specifically noted as containing such heteroatoms, the hydrocarbyl residue may also contain one or more carbonyl groups, amino groups, hydroxyl groups, or the like, or it may contain heteroatoms within the backbone of the hydrocarbyl residue. As one example, $Q^1$ may be a di-n- butylaminomethyl group formed by reaction of a terminal 3,5-dimethyl-1,4-phenyl group with the di-n-butylamine component of an oxidative polymerization catalyst. In some embodiments, each occurrence of $Q^1$ and $Q^2$ is methyl, each occurrence of $Q^3$ is hydrogen, each occurrence of $Q^4$ is hydrogen or methyl, the sum of x and y is 2 to about 15, each occurrence of $R^1$ and $R^2$ and $R^3$ and $R^4$ is independently hydrogen or methyl, and Y has the structure

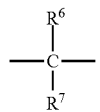

wherein each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group.

In the above structures, there are limitations on the variables x and y, which correspond to the number of arylene ether repeating units at two different places in the bifunctional poly(arylene ether) molecule. In the structure, x and y are independently 0 to about 30, specifically 0 to about 20, more specifically 0 to about 15, even more specifically 0 to about 10, yet more specifically 0 to about 8. The sum of x and y is at least 2, specifically at least 3, more specifically at least 4. A particular polyfunctional poly(arylene ether) resin can be analyzed by proton nuclear magnetic resonance spectroscopy ($^1$H-NMR) to determine whether these limitations are met for the entire resin, on average. Specifically, $^1$H-NMR can distinguish between resonances for protons associated with internal and terminal arylene ether groups, and internal and terminal residues of a polyhydric phenol, as well as other terminal residues. It is therefore possible to determine the average number of arylene ether repeat units per molecule, and the relative abundance of internal and terminal residues derived from dihydric phenol.

In one embodiment, the at least one poly(arylene ether) block has the structure

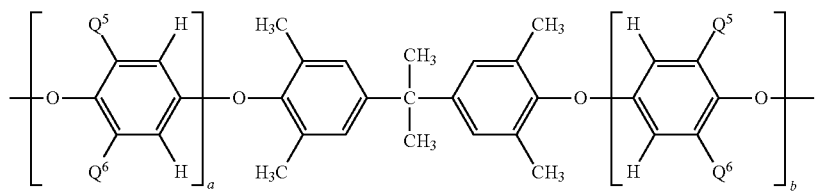

wherein each occurrence of $Q^5$ and $Q^6$ is independently methyl, di-n-butylaminomethyl, or morpholinomethyl; and each occurrence of a and b is independently 0 to about 20, with the proviso that the sum of a and b is at least 2, specifically at least 3, and more specifically at least 4.

The at least one poly(hydroxy ether) block has the structure

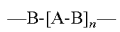

—B-[A-B]$_n$— wherein A is a hydrocarbyl residue of valence 2, and B is a residue of structure

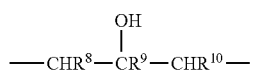

wherein $R^8$ to $R^{10}$ are each independently hydrogen, or $C_1$-$C_{12}$ hydrocarbyl; and n is about 1 to about 60.

In some embodiments, A is a residue having the structure

—O-[G$^1$]$_t$-[E]$_s$-[G$^1$]$_u$-O— wherein each G$^1$ is independently at each occurrence a $C_6$-$C_{20}$ aromatic radical, and E is independently at each occurrence a direct bond, or a structure selected from

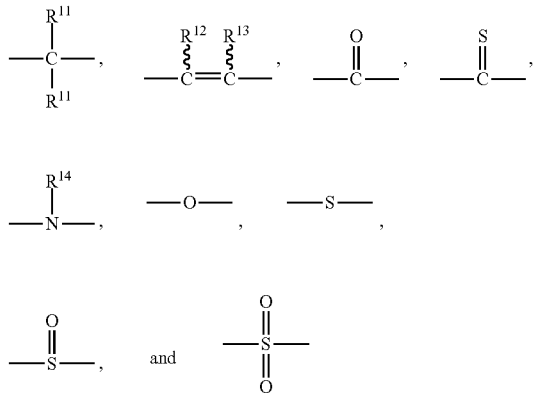

wherein each occurrence of $R^{11}$-$R^{14}$ is independently hydrogen or $C_1$-$C_{12}$ hydrocarbyl, s is 0 or 1, and t and u are each independently 1 to 10; and B is a residue of structure

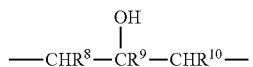

wherein $R^8$ to $R^{10}$ are each independently hydrogen, or $C_1$-$C_{12}$ hydrocarbyl; and n is about 1 to about 60.

In some embodiments, the at least one poly(hydroxyl ether) block has the structure

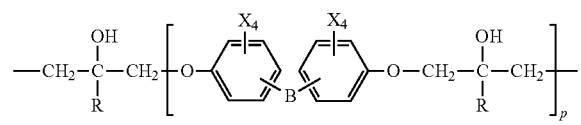

wherein each occurrence of R is independently hydrogen or methyl; each occurrence of X is independently hydrogen, chloro, fluoro, bromo, $C_1$-$C_{18}$ hydrocarbyl optionally further comprising a member or members selected from carboxy, carboxamide, ketone, aldehyde, alcohol, halogen, and nitrile; each occurrence of B is independently a carbon-carbon single bond, $C_1$-$C_{18}$ hydrocarbyl, $C_1$-$C_{12}$ hydrocarbyloxy, $C_1$-$C_{12}$ hydrocarbylthio, carbonyl, sulfide, sulfonyl, sulfonyl, phosphoryl, silane, or such groups further comprising a member or members selected from carboxyalkyl, carboxamide, ketone, aldehyde, alcohol, halogen, and nitrile; and p is independently 1 to about 20.

In some embodiments, the at least one poly(hydroxyl ether) block has the structure

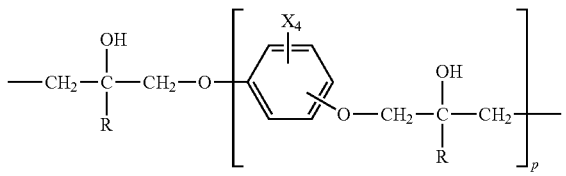

wherein R, X, and p are as defined above.

In some embodiments, the at least one poly(hydroxy ether) block has the structure

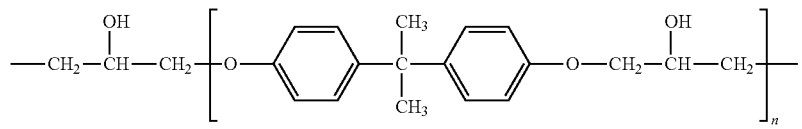

wherein n is about 1 to about 60, specifically about 1 to about 40, more specifically about 1 to about 20.

In some embodiments, residue A of the poly(hydroxyl ether) block is derived from a dihydroxy aromatic compound. Suitable dihydroxy aromatic compounds include resorcinol, catechol, hydroquinone, 1,5-dihydroxynaphthalene, 2,6-dihydroxynaphthalene, 2,7-dihydroxynapthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'-(1,3-phenylenediisopropylidene)bisphenol (bisphenol M), 4,4'-isopropylidenebis(3-phenylphenol), 4,4'-(1,4-phenylenediisoproylidene)bisphenol (bisphenol P), 4,4'-ethylidenediphenol (bisphenol E), 4,4'-oxydiphenol, 4,4'-thiodiphenol, 4,4'-thiobis(2,6-dimethylphenol), 4,4'-sulfonyldiphenol, 4,4'-sulfonylbis(2,6-dimethylphenol) 4,4'-sulfinyldiphenol, 4,4'-hexafluoroisoproylidene)bisphenol (Bisphenol AF), 4,4'-(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl) diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (spirobiindane), dihydroxybenzophenone (bisphenol K), tris(4-hydroxyphenyl)methane, tris(4-hydroxyphenyl) ethane, tris(4-hydroxyphenyl)propane, tris(4-hydroxyphenyl)butane, tris(3-methyl-4-hydroxyphenyl)methane, tris(3, 5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl) phenylphosphine oxide, dicyclopentadienylbis(2,6-dimethyl phenol), dicyclopentadienyl bis(2-methylphenol), dicyclopentadienyl bisphenol, 4,4'-dihydroxy-alpha-methylstilbene, and the like.

In some embodiments, residue A is derived from a dihydroxy aromatic compound selected from the group consisting of 2,2-bis(4-hydroxyphenyl)propane (bisphenol A), 2,2-bis (3,5-dichloro-4-hydroxyphenyl)propane (tetrachloro bisphenol A), 2,2-bis(3,5-dibromo-4-hydroxyphenyl)propane (tetrabromo bisphenol A), bis(4-hydroxyphenyl)methane (bisphenol F), 1,1-bis(4-hydroxyphenyl)ethane (bisphenol ACP), bis(4-hydroxyphenyl)sulfone (bisphenol S), 2,2-bis (4-hydroxycyclohexyl)propane (hydrogenated bisphenol A), 1,5-dihydroxynapthalene, 2,2',6,6'-tetramethyl-4,4'-dihydroxybiphenyl, and combinations thereof A specific dihydroxy aromatic compound is 2,2-bis(4-hydroxyphenyl)propane (bisphenol A).

In some embodiments, residue A of the poly(hydroxyl ether) block is derived from a dihydroxy compound selected from the group consisting of 1,4-butanediol, 1,6-hexanediol, neopentylglycol, 2,2-bis(4-hydroxy-cyclohexyl)propane, polyethylene glycol, polypropylene glycol, or the like.

In some embodiments, residue B is derived from an epihalohydrin selected from the group consisting of epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and combinations thereof A specific epihalohydrin is epichlorohydrin.

In some embodiments, the mole ratio of poly(hydroxyl ether) blocks to poly(arylene ether) blocks is 0.95:1 to 1.00:1. The lower limit of the mole ratio of poly(hydroxyl ether) blocks to poly(arylene ether) blocks can also be 0.96:1, specifically 0.97:1, more specifically 0.98:1, and still more specifically 0.99:1. The upper limit of the mole ratio of poly (hydroxyl ether) blocks to poly(arylene ether) blocks can also be 0.99:1, specifically 0.98:1, more specifically 0.97:1, and still more specifically 0.96:1. By maintaining the mole ratio of poly(hydroxyl ether) blocks to poly(arylene ether) blocks in these ranges, the molecular weight of the block copolymer is maximized, and epoxy end groups are substantially avoided. Thus, the poly(arylene ether)-poly(hydroxy ether) block copolymer has melt stability. It is important to note that the mole ratio of poly(hydroxyl ether) blocks to poly(arylene ether) blocks cannot be even slightly greater than 1.00:1. Thus, Comparative Example 1, with a mole ratio of 1.001:1, and Comparative Example 2, with amole ratio of 1.002:1, are outside the scope of these embodiments.

In some embodiments, the poly(arylene ether)-poly(hydroxy ether) block copolymer comprises about 1 to about 99 weight percent, specifically about 10 to about 90 weight percent, more specifically about 20 to about 80 weight percent, still more specifically about 30 to about 70 weight percent, and even more specifically about 40 to about 60 weight percent of the at least one poly(hydroxyl ether block);

and about 1 to about 99 weight percent, specifically about 10 to about 90 weight percent, more specifically about 20 to about 80 weight percent, still more specifically about 30 to about 70 weight percent, and even more specifically about 40 to about 60 weight percent of the at least one poly(arylene ether) block.

In some embodiments, the number average molecular weight of the poly(arylene ether)-poly(hydroxy ether) block copolymer as measured by gel permeation chromatography (GPC) against polystyrene standards is about 5,000 to about 50,000 atomic mass units, specifically about 5,500 to about 30,000 atomic mass units, more specifically about 5,000 to about 30,000 atomic mass units, still more specifically about 5,500 to about 20,000 atomic mass units, and even more specifically, about 5,500 to about 10,000 atomic mass units.

In some embodiments, the amount of terminal epoxy groups (i.e., the weight percent of terminal glycidyl groups) in the poly(arylene ether)-poly(hydroxy ether) block copolymer is less than about 0.09 weight percent, specifically less than about 0.05 weight percent, more specifically less than about 0.025 weight percent, still more specifically less than about 0.01 weight percent, and even more specifically less than about 0.005 weight percent, all based on the weight of the poly(arylene ether)-poly(hydroxy ether) block copolymer. The amount of terminal epoxy groups is measured by proton nuclear magnetic resonance ($^1$H-NMR) spectroscopy as set forth in the examples. When the terminal epoxy group content is less than about 0.09 weight percent, the poly(arylene ether)-poly(hydroxy ether) block copolymer has thermal stability and is suitable for thermal forming processes such as extrusion, calendaring, molding, and injection molding.

The poly(arylene ether)-poly(hydroxy ether) block copolymer can be prepared by a method comprising reacting a telechelic poly(arylene ether) having terminal hydroxyl groups with a telechelic poly(hydroxy ether) epoxy resin having terminal epoxy groups, wherein the mole ratio of the telechelic poly(hydroxy ether) to the telechelic poly(arylene ether) is 0.95:1 to 1.00:1. The reaction can be conducted in the presence of a solvent selected from the group consisting of aromatic hydrocarbons, chlorinated hydrocarbons, and polar aprotic solvents. Suitable polar aprotic solvents are ketones, esters, ethers, amides, nitriles, sulfoxides, sulfones, and mixtures thereof. In some embodiments, the solvent is cyclohexanone.

The reaction can be conducted in the presence of tertiary amine catalyst that is non-volatile under the reaction conditions. Examples of suitable tertiary amine catalysts are triethylamine, tri-n-propylamine, tri-n-butylamine, dimethylaniline, diethylaniline, alpha-methylbenzyldimethylamine, N,N-dimethylaminoethanol, N,N-dimethylaminopyridine (DMAP), alkylimidazoles, and the like, and mixtures thereof A specific tertiary amine catalyst is N,N-dimethylaminopyridine (DMAP).

In some embodiments, the telechelic poly(hydroxyl ether) epoxy resin is added to the telechelic poly(arylene ether) so that there is always an excess of phenolic groups over epoxy groups in the reaction mixture. The epoxy resin can be added in portions over about 15 to about 300 minutes, specifically about 30 to about 270 minutes, more specifically about 45 to about 240 minutes, still more specifically about 60 to about 210 minutes, and even more specifically about 90 to about 180 minutes. After addition of the epoxy resin to the poly (arylene ether) is complete, the mixture can be stirred for about 1 to about 12 hours at the reaction temperature. The reaction can be conducted at a temperature of about 100 to about 200° C., specifically, about 120 to about 180° C., more specifically, about 130 to about 170° C., and still more specifically, about 140 to about 160° C.

Upon completion of the reaction, the reaction mixture is cooled, and diluted with a co-solvent selected from the group consisting of aromatic hydrocarbons, chlorinated hydrocarbons, and polar aprotic solvents. In some embodiments, the co-solvent is 2-butanone. After dilution of the reaction mixture with the co-solvent, an anti-solvent is added to effect precipitation of the poly(arylene ether)-poly(hydroxy ether) block copolymer. The co-solvent can be an alcohol. Suitable alcohols include methanol and isopropanol. After precipitation, the product can be filtered, washed with anti-solvent, and dried under vacuum to afford the poly(arylene ether)-poly(hydroxy ether) block copolymer.

The poly(arylene ether)-poly(hydroxy ether) block copolymer has advantageous physical properties which makes it useful as a molding composition. These physical properties are improved over phenoxy resins. The poly (arylene ether)-poly(hydroxy ether) block copolymer has a density of about 1.1 to about 1.2 grams per cubic centimeter, as measured at 23° C. according to ASTM D792-08, compared to a density of 1.1744 grams per cubic centimeter for phenoxy resin; a glass transition temperature ($T_g$) of about 100 to about 170° C. as measured by differential scanning calorimetry according to ASTM D3418-08, compared to a $T_g$ of 90° C. for phenoxy resin; a heat distortion temperature (HDT) of about 90 to about 140° C. as measured according to ASTM D648-07, Method B at a load of 1.82 megapascals, compared to a HDT of 77° C. for phenoxy resin; a flexural modulus of about 2900 to about 3300 megapascals as measured according to ASTM D790-10, Method A, at 23° C. and a speed of 6.4 millimeters per minute, compared to a flexural modulus of 2761 megapascals for phenoxy resin.

As set forth above, the poly(arylene ether)-poly(hydroxy ether) block copolymer has a mole ratio of poly(hydroxy ether) blocks to poly(arylene ether) blocks is 0.95:1 to 1.00:1. This results in a poly(arylene ether)-poly(hydroxy ether) block copolymer having less than about 0.09 weight percent of terminal epoxy groups. This is a particularly advantageous feature because the poly(arylene ether)-poly(hydroxy ether) block copolymer has good melt stability. The poly(arylene ether)-poly(hydroxy ether) block copolymer can be melt-blended or melt-kneaded, and articles can be formed from the composition by extrusion, calendering, or molding. This is in marked contrast to poly(arylene ether)-poly(hydroxy ether) block copolymers having greater than or equal to 0.09 weight percent terminal epoxy groups. These block copolymers are subject to cross-linking reactions between the terminal epoxy groups and hydroxyl groups of the poly(arylene ether)-poly (hydroxy ether) block copolymer in the melt. Thus they are thermoset, not thermoplastic, materials. Therefore, poly (arylene ether)-poly(hydroxy ether) block copolymers having greater than or equal to 0.09 weight percent terminal epoxy groups cannot be melt-blended or melt-kneaded, and articles cannot be formed from poly(arylene ether)-poly(hydroxy ether) block copolymers having greater than or equal to 0.09 weight percent terminal epoxy groups by extrusion, calendering, or injection molding. Examples of articles that can be formed from the poly(arylene ether)-poly(hydroxy ether) block copolymer include, for example, containers having good barrier properties. Examples of articles that can be formed from compositions comprising the poly(arylene ether)-poly(hydroxy ether) block copolymer as a compatibilizer include electrical connectors formed from blends of a poly(arylene ether), a polyester, and the poly(arylene ether)-poly(hydroxy ether) block copolymer.

The poly(arylene ether)-poly(hydroxy ether) block copolymer is miscible with non-polar polymers. Thus, one embodiment is a composition comprising a poly(arylene ether)-poly(hydroxy ether) block copolymer and non-polar polymer selected from the group consisting of poly(arylene ether)s, poly(alkenyl aromatic)s (including polystyrenes), block copolymers of alkenyl aromatic compounds and conjugated dienes, hydrogenated block copolymers of alkenyl aromatic compounds and conjugated dienes, and combinations thereof.

The poly(arylene ether)-poly(hydroxy ether) block copolymer is miscible with polystyrene. Thus, one embodiment is a composition comprising the poly(arylene ether)-poly(hydroxy ether) block copolymer and a polystyrene. As used herein, the term polystyrene refers to a homopolymer of styrene. Thus, the residue of any monomer other than styrene is excluded from the polystyrene. The polystyrene can be atactic, syndiotactic, or isotactic. In some embodiments, the polystyrene consists of atactic polystyrene. In some embodiments, the polystyrene has a melt volume flow rate of 1.5 to 5 cubic centimeters per 10 minutes, measured at 200° C. and 5 kilogram load according to ISO 1133.

Figure 3:
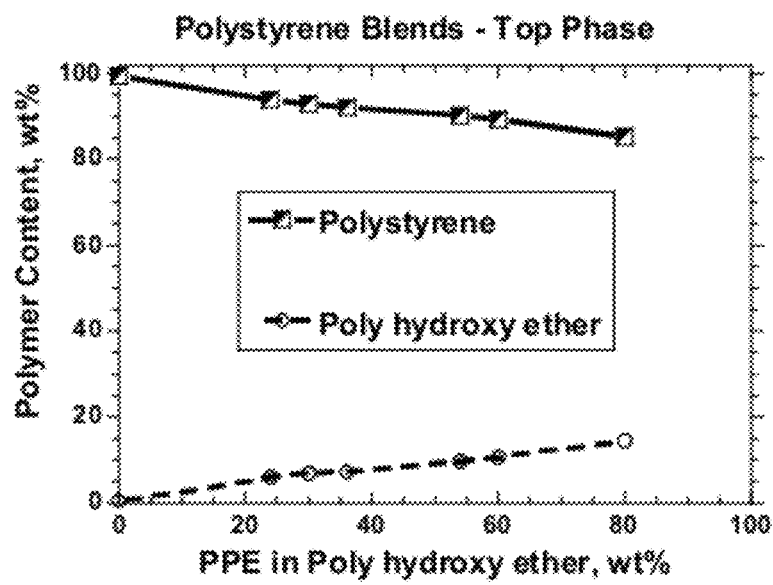
FIG. 3 is a plot of polystyrene (half-filled squares) and poly(arylene ether)-poly(hydroxy ether) block copolymer (open circles) content in the top phase of a two-phase chloroform solution of polystyrene and poly(arylene ether)-poly(hydroxy ether) block copolymer as a function of poly(arylene ether) block content.

FIG. 3 is a plot of polystyrene content (half-open squares) and poly(arylene ether)-poly(hydroxy ether) block copolymer content (open circles) in the top phase of a two-phase chloroform solution of poly(arylene ether) and poly(arylene ether)-poly(hydroxy ether) block copolymer as a function of poly(arylene ether) block content in the poly(arylene ether)-poly(hydroxy ether) block copolymer. The polystyrene was an atactic polystyrene obtained from Americas Styrenics as 685D1. The poly(arylene ether) block of the poly(arylene ether)-poly(hydroxy ether) block copolymer is derived from the telechelic poly(arylene ether) available from Sabic Innovative Plastics as PPO SA90. Phenoxy resin is represented by the data points at 0 weight percent poly(arylene ether) block in the poly(arylene ether)-poly(hydroxy ether) block copolymer. As can be seen from FIG. 3, phenoxy resin is immiscible with polystyrene. However, poly(arylene ether)-poly(hydroxy ether) block copolymers having greater than 0 weight percent of poly(arylene ether) block are miscible with the polystyrene, and the miscibility of the poly(arylene ether)-poly(hydroxy ether) block copolymer increases with increasing amounts of poly(arylene ether) blocks. In some embodiments, the composition comprises greater than 0 to about 15 weight percent, specifically about 1 to about 15 weight percent, more specifically about 5 to about 15 weight percent, of the poly(arylene ether)-poly(hydroxy ether) block copolymer; and about 85 to less than 100 weight percent, specifically about 85 to about 99 weight percent, more specifically about 85 to about 95 weight percent, of the polystyrene; wherein all weight percents are based on the total weight of the composition. In some embodiments, the composition comprises greater than 0 to about 15 weight percent, specifically about 1 to about 15 weight percent, more specifically about 5 to about 15 weight percent, of the poly(arylene ether)-poly(hydroxy ether) block copolymer; and about 85 to less than 100 weight percent, specifically about 85 to about 99 weight percent, more specifically about 85 to about 95 weight percent, of the polystyrene; wherein all weight percents are based on the total weight of the poly(arylene ether)-poly(hydroxy ether) block copolymer and the polystyrene.

Figure 4:
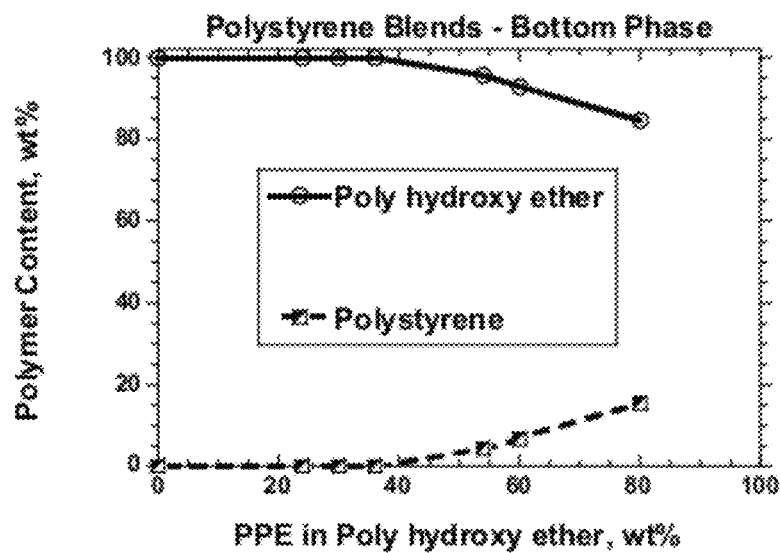
FIG. 4 is a plot of polystyrene (half-filled square) and poly(arylene ether)-poly(hydroxy ether) block copolymer (open circles) content in the bottom phase of a two-phase chloroform solution of polystyrene and poly(arylene ether)-poly(hydroxy ether) block copolymer blends as a function of poly(arylene ether) block content.

FIG. 4 is a plot of polystyrene content (open circles) and poly(arylene ether)-poly(hydroxy ether) block copolymer content (half-filled squares) in the bottom phase of a two-phase chloroform solution of poly(arylene ether) and poly(arylene ether)-poly(hydroxy ether) block copolymer as a function of poly(arylene ether) block content in the poly(arylene ether)-poly(hydroxy ether) block copolymer. Phenoxy resin is represented by the data points at 0 weight percent poly(arylene ether) block in the poly(arylene ether)-poly(hydroxy ether) block copolymer. As can be seen from FIG. 4, polystyrene is immiscible with phenoxy resin. However, polystyrene is miscible with poly(arylene ether)-poly(hydroxy ether) block copolymers having greater than 36 weight percent of poly(arylene ether) block, and the miscibility of the polystyrene increases with increasing amounts of poly(arylene ether) blocks in the poly(arylene ether)-poly(hydroxy ether) block copolymer. In some embodiments, the composition comprises greater than 0 to about 15 weight percent, specifically about 1 to about 15 weight percent, of the polystyrene; and about 85 to less than 100 weight percent, specifically about 85 to about 99 weight percent, of the poly(arylene ether)-poly(hydroxy ether) block copolymer; based on the total weight of the composition. In some embodiments, the composition comprises greater than 0 to about 15 weight percent, specifically about 1 to about 15 weight percent, of the polystyrene; and about 85 to less than 100 weight percent, specifically about 85 to about 99 weight percent, of the poly(arylene ether)-poly(hydroxy ether) block copolymer; based on the total weight of the polystyrene and the poly(arylene ether)-poly(hydroxy ether) block copolymer.

In some embodiments, the non-polar polymer is poly(arylene ether). The poly(arylene ether) comprises repeating structural units of the formula

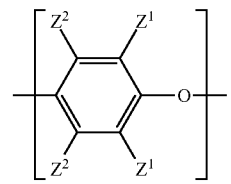

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. For example, $Z^1$ can be a di-n-butylaminomethyl group formed by reaction of a terminal 3,5-dimethyl-1,4-phenyl group with the di-n-butylamine component of an oxidative polymerization catalyst, or a morpholinomethyl group formed by reaction of a terminal 3,5-dimethyl-1,4-phenyl group with the morpholine component of an oxidative polymerization catalyst.

Figure 5:
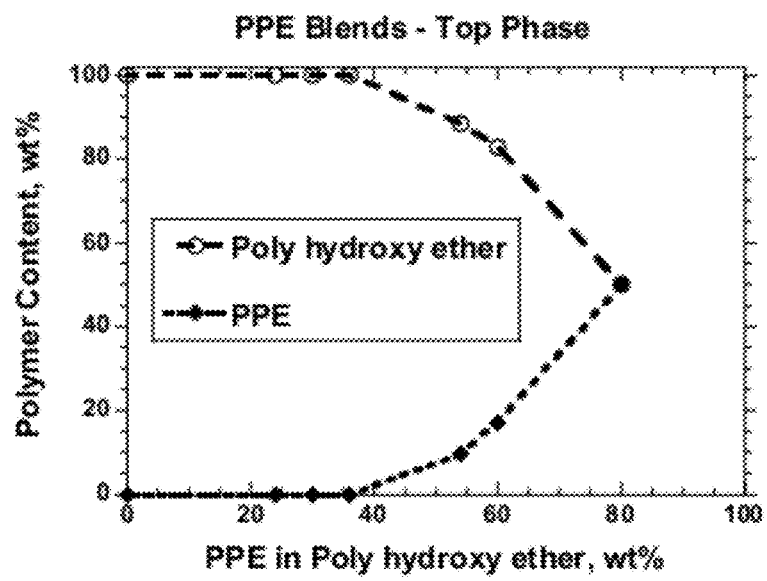
FIG. 5 is a plot of poly(arylene ether) (filled diamonds) and poly(arylene ether)-poly(hydroxy ether) block copolymer (open circles) content in the top phase of a two-phase chloroform solution of poly(arylene ether) and poly(arylene ether)-poly(hydroxy ether) block copolymer as a function of poly(arylene ether) block content.

FIG. 5 is a plot of poly(arylene ether)-poly(hydroxy ether) block copolymer content (open circles) and poly(arylene ether) content (filled diamonds) in the top phase of a two-phase chloroform solution of poly(arylene ether) and poly (arylene ether)-poly(hydroxy ether) block copolymer as a function of poly(arylene ether) block content in the poly (arylene ether)-poly(hydroxy ether) block copolymer. The poly(arylene ether) was a poly(2,6-dimethyl-1,4-phenylene ether) having an intrinsic viscosity of about 0.40 deciliter per gram in chloroform at 25° C., obtained as PPO 640 from Sabic Innovative Plastics. Phenoxy resin is represented by the data points at 0 weight percent poly(arylene ether) block in the poly(arylene ether)-poly(hydroxy ether) block copolymer. As can be seen from FIG. 5, poly(arylene ether) is immiscible with phenoxy resin. However, poly(arylene ether) is miscible with poly(arylene ether)-poly(hydroxy ether) block copolymers having greater than 36 weight percent of poly(arylene ether) block, and the miscibility of the poly (arylene ether) increases with increasing amounts of poly (arylene ether) block in the poly(arylene ether)-poly(hydroxy ether) block copolymer. In some embodiments, the composition comprises greater than 0 to about 50 weight percent, specifically about 1 to about 50 weight percent, of the poly (arylene ether); and about 50 to less than 100 weight percent, specifically about 50 to about 99 weight percent, of the poly (arylene ether)-poly(hydroxy ether) block copolymer; wherein all weight percent are based on the total weight of the composition. In some embodiments, the composition comprises greater than 0 to about 50 weight percent, specifically about 1 to about 50 weight percent, of the poly(arylene ether); and about 50 to less than 100 weight percent, specifically about 50 to about 99 weight percent, of the poly(arylene ether)-poly(hydroxy ether) block copolymer; wherein all weight percent are based on the total weight of the poly (arylene ether) and the poly(arylene ether)-poly(hydroxy ether) block copolymer.

Figure 6:
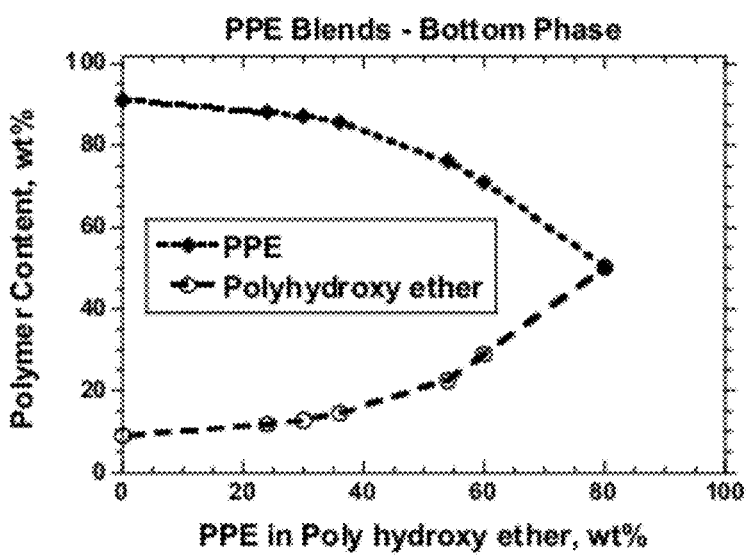
FIG. 6 is a plot of poly(arylene ether) (filled diamonds) and poly(arylene ether)-poly(hydroxy ether) block copolymer (open circles) content in the bottom phase of a two-phase chloroform solution of poly(arylene ether) and poly(arylene ether)-poly(hydroxy ether) block copolymer as a function of poly(arylene ether) block content.

FIG. 6 is a plot of poly(arylene ether) content (open circles) and poly(arylene ether)-poly(hydroxy ether) block copolymer content (filled diamonds) in the bottom phase of a two-phase chloroform solution of poly(arylene ether) and poly (arylene ether)-poly(hydroxy ether) block copolymer as a function of poly(arylene ether) block content. Phenoxy resin is represented by the data points at 0 weight percent poly (arylene ether) block in the poly(arylene ether)-poly(hydroxy ether) block copolymer. As can be seen from FIG. 6, phenoxy resin is only miscible with poly(arylene ether) to the extent of about 10 weight percent. However, as the amount of poly (arylene ether) block in the poly(arylene ether)-poly(hydroxy ether) block copolymer increases, the miscibility of the poly (arylene ether)-poly(hydroxy ether) block copolymer with poly(arylene ether) increases. In some embodiments, the composition comprises about 10 to about 50 weight percent, specifically about 10 to about 15 weight percent of the poly (arylene ether)-poly(hydroxy ether) block copolymer; and about 50 to about 90 weight percent, specifically about 85 to about 90 weight percent, of the poly(arylene ether); based on the total weight of the composition. In some embodiments, the composition comprises about 10 to about 50 weight percent, specifically about 10 to about 15 weight percent of the poly(arylene ether)-poly(hydroxy ether) block copolymer; and about 50 to about 90 weight percent, specifically about 85 to about 90 weight percent, of the poly(arylene ether); based on the total weight of the poly(arylene ether)-poly(hydroxy ether) block copolymer and the poly(arylene ether).

One embodiment is a composition comprising a poly (arylene ether)-poly(hydroxy ether) block copolymer, a non-polar polymer such as polystyrene or poly(arylene ether) or a mixture thereof, and glass fibers. Glass fibers are generally well known in the art, as are their methods of manufacture. In one embodiment, the glass is relatively soda free. Fibrous glass filaments comprised of lime-alumino-borosilicate glass, which is also known as "E" glass are often especially suitable. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling. For achieving optimal mechanical properties, fiber diameter of about 6 to about 20 micrometers are preferred, with a diameter of from about 10 to about 15 micrometers being more preferred. In preparing the molding compositions it is convenient to use the fiber in the form of chopped strands of from about 0.125 inch (about 3.175 millimeters) to about 0.5 inch (about 12.7 millimeters) long, although roving may also be used. In articles molded from the compositions, the fiber length is typically shorter, presumably due to fiber fragmentation during compounding of the composition. The length of such short glass fibers present in final molded compositions is typically less than about 4 millimeters. The fibers can be treated with a variety of coupling agents to improve adhesion to the resin matrix. Preferred coupling agents include amino-functionalized silanes, epoxy-functionalized silanes, amide-functionalized silanes, and mercapto-functionalized silanes. Organometallic coupling agents, for example, titanium or zirconium based organometallic compounds, can also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing glass fiber monofilaments having a diameter in the range of about 10 to about 24 micrometers, specifically about 13 to about 18 micrometers, is impregnated with a melted thermoplastic, preferably a polyester. After cooling, the impregnated bundle is cut into pellets having a length of greater than 5 millimeters, preferably greater than 9 millimeters. For impregnation, the poly(arylene ether)-poly(hydroxy ether) block copolymer of the present invention can be used in order to improve the wetting rate of the filaments to make long glass fiber pellets. These pellets can be incorporated into the polystyrene composition, to form long fiber glass reinforced polystyrene compositions. The length of long glass fiber present in the composition prepared by this method is typically greater than that prepared by incorporation of short fibers and the predominant portion of the long glass fibers present have a length greater than 4 millimeters in the molded part. Such long fiber glass reinforced compositions can be used in different molding methods such as injection molding, compression molding, thermoforming, and the like. As in the case of short fibers, the long fibers can also be treated with a variety of coupling agents to improve adhesion to resin. For those skilled in the art, a continuous process such as pultrusion technique for direct incorporation of long glass fibers in high flow compositions will also be possible.

When present in the composition, glass fibers can be used in an amount of about 5 to about 60 weight percent, specifically about 10 to about 50 weight percent, more specifically about 20 to about 40 weight percent, based on the total weight of the composition.

In some embodiments, adhesion of the polystyrene to the glass fibers is improved by the poly(arylene ether)-poly(hydroxy ether) block copolymer relative to the same composition without the poly(arylene ether)-poly(hydroxy ether) block copolymer. The improved adhesion results in improved stiffness and ductility as objectively measured, for example, by increased flexural modulus and strength at 23° C.

As set forth above, the poly(arylene ether)-poly(hydroxy ether) block copolymer is miscible with non-polar polymers. The poly(arylene ether)-poly(hydroxy ether) block copolymer is also miscible with polar polymers. Based on its dual affinity for both non-polar and polar polymers, the poly(arylene ether)-poly(hydroxy ether) block copolymer is ideally suited for use as a compatibilizing agent for mixtures of non-polar polymers and polar polymers. Thus, one embodiment is a composition comprising a poly(arylene ether)-poly(hydroxy ether) block copolymer, a non-polar polymer, and a polar polymer. In one embodiment, the non-polar polymer is polystyrene, and the polar polymer is selected from the group consisting of polyethylene terephthalate, polybutylene terephthalate, polylactic acid, and combinations thereof. In another embodiment, the non-polar polymer is poly(arylene ether), and the polar polymer is selected from the group consisting of polyethylene terephthalate, polybutylene terephthalate, polylactic acid, poly(ethylene-vinyl acetate) (EVA), poly(ethylene-ethyl acrylate) (EEA), polyvinyl acetate, polyvinyl alcohol, and combinations thereof One embodiment is a composition comprising a poly(arylene ether)-poly(hydroxy ether) block copolymer, a non-polar polymer, and a polar polymer, wherein the compatibility of the non-polar polymer and the polar polymer is improved by the presence of the poly(arylene ether)-poly(hydroxy ether) block copolymer, as indicated by an improved notched Izod impact strength compared to the same composition without the poly(arylene ether)-poly(hydroxy ether) block copolymer. The non-polar polymer in this embodiment comprises poly(arylene ether) or polystyrene. Without being bound by theory, the improved notched Izod impact strength is a result of improved interfacial adhesion between the polar polymer phase and the non-polar polymer phase in the composition. The improved interfacial adhesion decreases the likelihood of delamination of the phases under impact forces.

The presence of the poly(arylene ether)-poly(hydroxy ether) block copolymer in compositions comprising non-polar polymers and polar polymers can also improve the melt processability of the composition during extrusion and molding processes which take place above the glass transition temperature of the composition. Without being bound by theory, the improved processability results from stabilization of the composition morphology in the melt by the poly(arylene ether)-poly(hydroxy ether) block copolymer. Improved interfacial adhesion between the non-polar polymer and the polar polymer phases above the glass transition temperature reduces the likelihood of delamination of the phases during the shear forces present in melt processing.

One embodiment comprises a poly(arylene ether)-poly(hydroxy ether) block copolymer, a polystyrene, and a polar polymer selected from the group consisting of polyethylene terephthalate, polybutylene terephthalate, polylactic acid, and combinations thereof, wherein the compatibility of the polystyrene and the polar polymer is improved by the presence of the poly(arylene ether)-poly(hydroxy ether) block copolymer, as indicated by an improved notched Izod impact strength compared to the same composition without the poly(arylene ether)-poly(hydroxy ether) block copolymer.

One embodiment comprises a poly(arylene ether)-poly(hydroxy ether) block copolymer, a poly(arylene ether), and a polar polymer selected from the group consisting of polyethylene terephthalate, polybutylene terephthalate, polylactic acid, poly(ethylene-vinyl acetate) (EVA), poly(ethylene-ethyl acrylate) (EEA), polyvinyl acetate, polyvinyl alcohol, and combinations thereof, wherein the compatibility of the poly(arylene ether) and the polar polymer is improved by the presence of the poly(arylene ether)-poly(hydroxy ether) block copolymer, as indicated by an improved notched Izod impact strength compared to the same composition without the poly(arylene ether)-poly(hydroxy ether) block copolymer.

Any of the compositions disclosed herein can optionally comprise about 0.5 to about 5 weight percent, specifically about 1 to about 4 weight percent, and more specifically about 1.5 to about 3 weight percent, based on the total weight of the composition, of one or more additives selected from the group consisting of fillers, stabilizers, mold release agents, processing aids, drip retardants, nucleating agents, UV blockers, dyes, pigments, antioxidants, anti-static agents, mineral oil, metal deactivators, antiblocking agents, nanoclays, and electrically conductive agents.

The compositions can be prepared by melt-blending or melt-kneading the individual components together. The melt-blending or melt-kneading can be done using known equipment such as ribbon blenders, Henschel mixers, Banbury mixers, drum tumblers, single screw extruders, twin-screw extruders, multi-screw extruders, co-kneaders, and the like.

Articles can be formed from the compositions by extrusion, thermoforming, or molding. In one embodiment, the article is formed by molding. Various known molding methods can be used, for example injection molding, injection compression molding, gas assist injection molding, rotational molding, blow molding, compression molding, and the like.

In some embodiments, the article is formed by injection molding. In injection molding, the composition formed by melt-blending or melt-kneading, and in the form of pellets, is fed by an auger from a hopper into a heated injection barrel. The injection barrel comprises a screw for feeding the composition into a mold, and external heaters. Once in the injection barrel, the composition is heated externally by the injection barrel so that the composition softens and melts to form a molten composition, or melt. The composition is further heated by the shearing force of the screw moving the composition forward. The composition is extruded through a die to form a continuous strand, which is cooled to below the glass transition temperature of the composition and the cooled strand is pelletized. In some embodiments the target melt temperature is about 100 to about 300° C., specifically about 120 to about 380° C., and more specifically about 140 to about 260° C. In some embodiments the die temperature is about 190 to about 280° C., specifically about 200 to about 260° C., and more specifically about 220 to about 240° C.

The amount of the molten composition sufficient to completely fill the mold is called a load, or shot. The shot is forced under pressure from the injection screw into a heated mold, where it ideally fills all the voids in the open volume of the mold. The composition is then cooled sufficiently to be released from the mold as a firm piece. In one embodiment the mold temperature is about 30 to about 100° C., specifically about 40 to about 90° C., and more specifically about 50 to about 80° C. In some embodiments, the article is formed by compression injection molding. Compression injection molding is the same as injection molding, except that further compression is added to the composition while it resides in the mold. The disclosure in U.S. Pat. No. 5,916,496 to Weber provides a description of both injection molding and compression injection molding.

The invention includes at least the following embodiments:

Embodiment 1

A poly(arylene ether)-poly(hydroxy ether) block copolymer comprising: at least one poly(hydroxy ether) block, and at least one poly(arylene ether) block; wherein the mole ratio of poly(hydroxy ether) blocks to poly(arylene ether) blocks is 0.95:1 to 1.00:1.

Embodiment 2

The poly(arylene ether)-poly(hydroxy ether) block copolymer of embodiment 1, wherein the poly(arylene ether)-poly(hydroxy ether) block copolymer has a number average molecular weight of about 5,000 to about 50,000 atomic mass units.

Embodiment 3

The poly(arylene ether)-poly(hydroxy ether) block copolymer of embodiment 1 or 2, wherein the poly(arylene ether)-poly(hydroxy ether) block copolymer has less than 0.09 weight percent of terminal epoxy groups.

Embodiment 4

The poly(arylene ether)-poly(hydroxy ether) block copolymer of any of embodiments 1-3, comprising about 1 to about 99 weight percent of the at least one poly(hydroxy ether) block; and about 1 to about 99 weight percent of the at least one poly(arylene ether) block.

Embodiment 5

The poly(arylene ether)-poly(hydroxy ether) block copolymer of any of embodiments 1-4, wherein the at least one poly(hydroxy ether) block has the structure

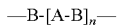

wherein A is a residue of structure

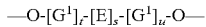

wherein each $G^1$ is independently at each occurrence a $C_6$-$C_{20}$ aromatic radical, and E is independently at each occurrence a direct bond, or a structure selected from the group consisting of

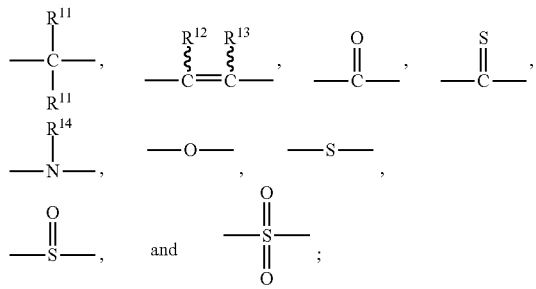

wherein each occurrence of $R^{11}$-$R^{14}$ is independently hydrogen or $C_1$-$C_{12}$ hydrocarbyl, s is 0 or 1, and t and u are each independently 1 to 10; and
wherein B is a residue of structure

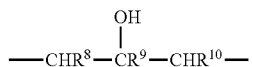

wherein $R^8$ to $R^{10}$ are each independently hydrogen, or $C_1$-$C_{12}$ hydrocarbyl; and
wherein n is about 1 to about 60.

Embodiment 6

The poly(arylene ether)-poly(hydroxy ether) block copolymer of embodiment 5, wherein A is derived from a dihydroxy aromatic compound selected from the group consisting of 2,2-bis(4-hydroxyphenyl)propane (bisphenol A), 2,2-bis(3,5-dichloro-4-hydroxyphenyl)propane (tetrachloro bisphenol A), 2,2-bis(3,5-dibromo-4-hydroxyphenyl)propane (tetrabromo bisphenol A), bis(4-hydroxyphenyl)methane (bisphenol F), 1,1-bis(4-hydroxyphenyl)ethane (bisphenol ACP), bis(4-hydroxyphenyl)sulfone (bisphenol S), 2,2-bis(4-hydroxycyclohexyl)propane (hydrogenated bisphenol A), 1,5-dihydroxynapthalene, 2,2',6,6'-tetramethyl-4,4'-dihydroxybiphenyl, and combinations thereof.

Embodiment 7

The poly(arylene ether)-poly(hydroxy ether) block copolymer of embodiment 5 or 6, wherein B is derived from an epihalohydrin selected from the group consisting of epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and combinations thereof.

Embodiment 8

The poly(arylene ether)-poly(hydroxy ether) block copolymer of any of embodiments 1-7, wherein the at least one poly(hydroxy ether) block has the structure

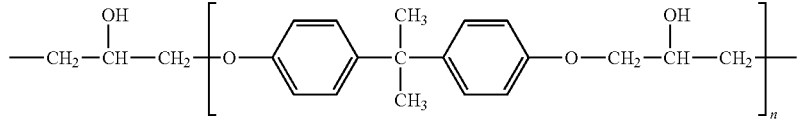

wherein n is about 1 to about 60.

Embodiment 9

The poly(arylene ether)-poly(hydroxy ether) block copolymer of any of embodiments 1-8, wherein the at least one poly(arylene ether) block has the structure

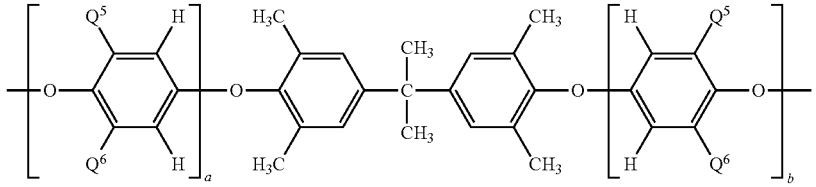

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and
wherein the at least one poly(hydroxy ether) block has the structure

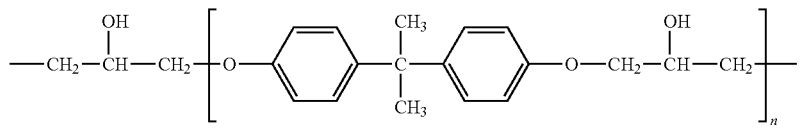

wherein n is about 1 to about 60.

Embodiment 10

A poly(arylene ether)-poly(hydroxy ether) block copolymer comprising: at least one poly(hydroxy ether) block, and at least one poly(arylene ether) block, wherein the poly(arylene ether)-poly(hydroxy ether) block copolymer has a number average molecular weight of about 5,000 to about 50,000 atomic mass units.

Embodiment 11

The poly(arylene ether)-poly(hydroxy ether) block copolymer of embodiment 10, wherein the poly(arylene ether)-poly(hydroxy ether) block copolymer has less than 0.09 weight percent of terminal epoxy groups, based on the weight of the poly(arylene ether)-poly(hydroxy ether) block copolymer.

Embodiment 12

The poly(arylene ether)-poly(hydroxy ether) block copolymer of embodiment 10 or 11, comprising about 1 to about 99 weight percent of the at least one poly(hydroxy ether) block, and about 1 to about 99 weight percent of the at least one poly(arylene ether) block, based on the weight of the poly(arylene ether)-poly(hydroxy ether) block copolymer.

Embodiment 13

The poly(arylene ether)-poly(hydroxy ether) block copolymer of any of embodiments 10-12, wherein the at least one poly(hydroxy ether) block has the structure —B-[A-B]$_n$— wherein A is a residue of structure

—O-[G$^1$]$_t$-[E]$_s$-[G$^1$]$_u$-O— wherein each G$^1$ is independently at each occurrence a $C_6$-$C_{20}$ aromatic radical, and E is independently at each occurrence a direct bond, or a structure selected from the group consisting of

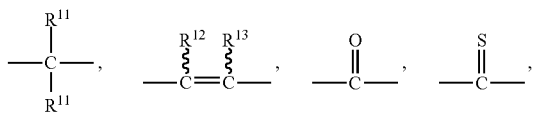

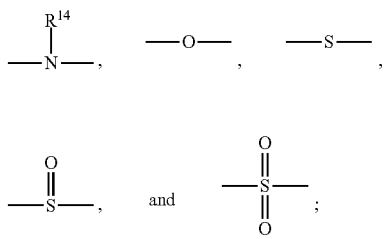

wherein each occurrence of $R^{11}$-$R^{14}$ is independently hydrogen or $C_1$-$C_{12}$ hydrocarbyl, s is 0 or 1, and t and u are each independently 1 to 10; and
wherein B is a residue of structure

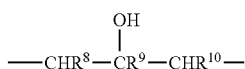

wherein $R^8$ to $R^{10}$ are each independently hydrogen, or $C_1$-$C_{12}$ hydrocarbyl; and
wherein n is about 1 to about 60.

Embodiment 14

The poly(arylene ether)-poly(hydroxy ether) block copolymer of any of embodiments 10-13, wherein the at least one poly(hydroxy ether) block has the structure

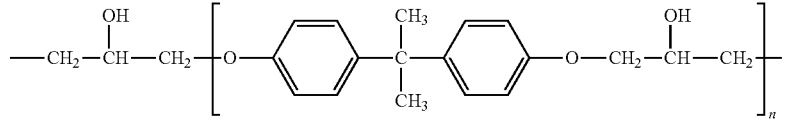

wherein n is about 1 to about 60.

Embodiment 15

The poly(arylene ether)-poly(hydroxy ether) block copolymer of any of embodiments 10-14,
wherein the at least one poly(arylene ether) block comprises the structure

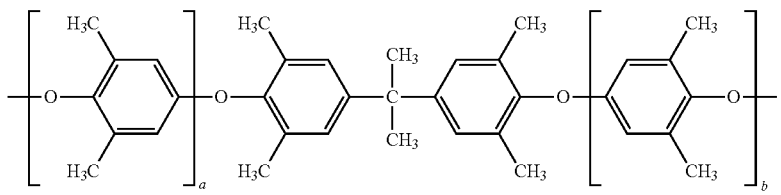

wherein a and b are each independently 0 to 50, provided that the sum of a and b is at least 3; and wherein the at least one poly(hydroxy ether) block has the structure

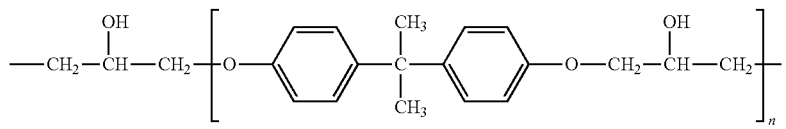

wherein n is about 1 to about 60.

Embodiment 16

A composition comprising the poly(arylene ether)-poly(hydroxy ether) block copolymer of any of embodiments 1-15, and a non-polar polymer selected from the group consisting of poly(arylene ether)s, poly(alkenyl aromatic)s, block copolymers of alkenyl aromatic compounds and conjugated dienes, hydrogenated block copolymers of alkenyl aromatic compounds and conjugated dienes, and combinations thereof.

Embodiment 17

The composition of embodiment 16, wherein the non-polar polymer comprises a polystyrene.

Embodiment 18

The composition of embodiment 17, comprising about 1 to about 15 weight percent of the poly(arylene ether)-poly(hydroxy ether) block copolymer, and about 85 to about 99 weight percent of the polystyrene, based on the total weight of the poly(arylene ether)-poly(hydroxy ether) block copolymer and the polystyrene.

Embodiment 19

The composition of embodiment 17, comprising about 1 to about 15 weight percent of the polystyrene, and about 85 to about 99 weight percent of the poly(arylene ether)-poly(hydroxy ether) block copolymer, based on the total weight of the polystyrene and the poly(arylene ether)-poly(hydroxy ether) block copolymer.

Embodiment 20

The composition of any of embodiments 17-19, further comprising a polar polymer selected from the group consisting of polyesters, poly(ethylene-vinyl acetate), poly(ethylene-ethyl acrylate), poly(vinyl acetate), poly(vinyl alcohol), and combinations thereof.

Embodiment 21

The composition of any of embodiments 17-19, further comprising a polyester selected from the group consisting of poly(ethylene terephthalate), poly(trimethylene terephthalate), poly(butylene terephthalate), poly(lactic acid), and combinations thereof.

Embodiment 22

The composition of embodiment 16, wherein the non-polar polymer comprises a poly(arylene ether).

Embodiment 23

The composition of embodiment 22, comprising about 1 to about 50 weight percent of the poly(arylene ether), and about 50 to about 99 weight percent of the poly(arylene ether)-poly(hydroxy ether) block copolymer, based on the total weight of the poly(arylene ether) and the poly(arylene ether)-poly(hydroxy ether) block copolymer.

Embodiment 24

The composition of embodiment 22 or 23, comprising about 10 to about 50 weight percent of the poly(arylene ether)-poly(hydroxy ether) block copolymer, and about 50 to about 90 weight percent of the poly(arylene ether), based on the total weight of the poly(arylene ether)-poly(hydroxy ether) block copolymer and the poly(arylene ether).

Embodiment 25

The composition of any of embodiments 22-24, further comprising a polar polymer selected from the group consisting of polyesters, poly(ethylene-vinyl acetate), poly(ethylene-ethyl acrylate), poly(vinyl acetate), poly(vinyl alcohol), and combinations thereof.

Embodiment 26

The composition of any of embodiments 22-24, further comprising a polyester selected from the group consisting of poly(ethylene terephthalate), poly(trimethylene terephthalate), poly(butylene terephthalate), poly(lactic acid), and combinations thereof.

Embodiment 27

The composition of any of embodiments 16-26, further comprising glass fibers.

Embodiment 28

The composition of embodiment 27, wherein the non-polar polymer comprises a polystyrene.

Embodiment 29

A method of making a poly(arylene ether)-poly(hydroxy ether) block copolymer, comprising: reacting a telechelic poly(arylene ether) having terminal hydroxyl groups with a telechelic poly(hydroxy ether) epoxy resin having terminal epoxy groups; wherein the mole ratio of the telechelic poly(hydroxy ether) to the telechelic poly(arylene ether) is 0.95:1 to 1.00:1.

Embodiment 30

The method of embodiment 29, wherein said telechelic poly(hydroxyl ether) is added to said telechelic poly(arylene ether) in portions over a period of about 15 to about 300 minutes.

Embodiment 31

A poly(arylene ether)-poly(hydroxy ether) block copolymer prepared by the method of embodiment 29 or 30.

Embodiment 32

A method for forming a composition comprising melt-blending or melt-kneading the components of the composition of any of embodiments 16-28.

Embodiment 33

An article comprising the poly(arylene ether)-poly(hydroxy ether) block copolymer of any of embodiments 1-15.

Embodiment 34

A method for forming an article comprising shaping the poly(arylene ether)-poly(hydroxy ether) block copolymer of any of embodiments 1-15 by extrusion, thermoforming, or molding.

The invention is further illustrated by the following non-limiting examples.

Examples 1-8 and Comparative Examples 1-3

Individual components used to prepare the compositions in the working examples are summarized in Table 1.

TABLE 1

Materials

| Name | Description |
| --- | --- |
| SA90 | Telechelic poly(2,6-dimethyl-1,4-phenylene ether) having a hydroxyl equivalent weight of 778 grams per equivalent, and an intrinsic viscosity of 0.090 deciliters per gram as measured at 25° C. in chloroform; obtained as SA90 from SABIC Innovative Plastics. |
| PPE 0.065 IV | Telechelic poly(2,6-dimethyl-1,4-phenylene ether) having an intrinsic viscosity of 0.065 deciliter per gram measured in chloroform at 25° C., and a hydroxyl equivalent weight of 627 grams per equivalent, prepared according to the procedure of Example 4 in U.S. Pat. No. 7,671,167 B2 to Carrillo et al. |
| PPE 0.117 IV | Telechelic poly(2,6-dimethyl-1,4-phenylene ether) having an intrinsic viscosity of 0.117 deciliter per gram measured in chloroform at 25° C., and a hydroxyl equivalent weight of 1691 grams per equivalent, prepared according to the procedure of Example 1 in U.S. Pat. No. 7,671,167 B2 to Carrillo et al. |
| DER 317 | 2,2-Bis(4-hydroxyphenyl)propane-epichlorohydrin polymer, a high viscosity liquid epoxy resin having an epoxide equivalent weight of 199.3 grams per equivalent; obtained as DER 317 from Dow Chemical. |
| DER 667-E | 2,2-Bis(4-hydroxyphenyl)propane-epichlorohydrin polymer, a high molecular weight Type 7 solid epoxy resin having an epoxide equivalent weight of 1744 grams per equivalent; obtained as DER 667-E from Dow Chemical. |
| DER 668-20 | 2,2-Bis(4-hydroxyphenyl)propane-epichlorohydrin polymer, a high molecular weight Type 8 solid epoxy resin having an epoxide equivalent weight of 2500 grams per equivalent; obtained as DER 668-20 from Dow Chemical. |
| DER 6155 | 2,2-Bis(4-hydroxyphenyl)propane-epichlorohydrin polymer, a high molecular weight Type 5 solid epoxy resin having an epoxide equivalent weight of 1365 grams per equivalent obtained as DER 6155 from Dow Chemical. |
| EPON 1001F | 2,2-Bis(4-hydroxyphenyl)propane-epichlorohydrin polymer, a solid epoxy resin having an epoxide equivalent weight of 528 grams per equivalent obtained as EPON 1001F from Momentive Specialty Chemicals. |
| EPON 1002F | 2,2-Bis(4-hydroxyphenyl)propane-epichlorohydrin polymer, a solid epoxy resin having an epoxide equivalent weight of 1810 grams per equivalent; obtained as EPON 1002F from Momentive Specialty Chemicals. |

TABLE 1-continued

| Materials | |
|---|---|
| Name | Description |
| EPON 1007F | 2,2-Bis(4-hydroxyphenyl)propane-epichlorohydrin polymer, a solid epoxy resin having an epoxide equivalent weight of 663 grams per equivalent obtained as EPON 1007F from Momentive Specialty Chemicals. |
| PKHH | A phenoxy resin produced by copolymerization of 2,2-bis(4-hydroxyphenyl)propane and 2,2-bis(4-hydroxyphenyl)propane-epichlorohydrin polymer, having an $M_n$ of 13,000 Daltons; obtained as PKHH from InChem Corporation. |

Poly(arylene ether)-poly(hydroxy ether) block copolymers were prepared by the reaction of telechelic poly(arylene ether) with 2,2-bis(4-hydroxyphenyl)propane-epichlorohydrin polymers. The procedures are described below.

Preparative Example 1

Poly(Arylene Ether)—Poly(Hydroxy Ether) Block Copolymer with 24 Weight Percent Poly(Arylene Ether) Blocks

TABLE 2

| | Reactant Amounts | | | |
|---|---|---|---|---|
| Reactant | HEW[1] (grams/equivalent) | EEW[2] (grams/equivalent) | Amount (grams) | Amount equivalents |
| SA90 | 778 | — | 118.67 | 0.15253 |
| DER 668-20 | — | 2500 | 381.33 | 0.15253 |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90 minutes as follows.

| Time (minutes) | Amount Added (weight %) |
|---|---|
| 0 | 73 |
| 30 | 23 |
| 60 | 3.5 |
| 90 | 0.5 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 465 grams (93%).

Preparative Example 2

Poly(Arylene Ether)—Poly(Hydroxy Ether) Block Copolymer with 30 Weight Percent Poly(Arylene Ether) Blocks

TABLE 3

| | Reactant Amounts | | | | |
|---|---|---|---|---|---|
| Reactant | HEW[1] (grams/equiv) | EEW[2] (grams/equiv) | Amount (grams) | Amount (equiv) | Ratio Epoxy to PPE |
| SA90 | 778 | — | 150.31 | 0.1932 | 1.000:1 |
| EPON 1007F | — | 1810 | 349.69 | 0.1932 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90 minutes as follows.

| Time (minutes) | Amount Added (weight %) |
|---|---|
| 0 | 63 |
| 30 | 32 |
| 60 | 4 |
| 90 | 1 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 462 grams (92.4%).

Preparative Example 3

Poly(Arylene Ether)—Poly(Hydroxy Ether) Block Copolymer with 36 Weight Percent Poly(Arylene Ether) Blocks

TABLE 4

Reactant Amounts

| Reactant | HEW[1] (grams/ equiv) | EEW[2] (grams/ equiv) | Amount (grams) | Amount (equiv) | Ratio Epoxy to PPE |
|---|---|---|---|---|---|
| SA90 | 778 | — | 181.52 | 0.2333 | 1.000:1 |
| DER 6155 | — | 1365 | 318.47 | 0.2333 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90 minutes as follows.

| Time (minutes) | Amount Added (weight %) |
|---|---|
| 0 | 63 |
| 30 | 31 |
| 60 | 5 |
| 90 | 1 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 455 grams (91%).

Preparative Example 4

Poly(Arylene Ether)—Poly(Hydroxy Ether) Block Copolymer With 54 Weight Percent Poly(Arylene Ether) Blocks

TABLE 5

Reactant Amounts

| Reactant | HEW[1] (grams/ equiv) | EEW[2] (grams/ equiv) | Amount (grams) | Amount (equiv) | Ratio Epoxy to PPE |
|---|---|---|---|---|---|
| SA90 | 778 | — | 269.99 | 0.3470 | 0.9997:1 |
| EPON 1002F | — | 663 | 230.03 | 0.3469 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90

| Time (minutes) | Amount Added (Weight %) |
|---|---|
| 0 | 70 |
| 30 | 25 |
| 60 | 4 |
| 90 | 1 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 460 grams (92%).

Preparative Example 5

Poly(Arylene Ether)—Poly(Hydroxy Ether) Block Copolymer with 60 Weight Percent Poly(Arylene Ether) Blocks

TABLE 6

Reactant Amounts

| Reactant | HEW[1] (grams/ equiv) | EEW[2] (grams/equiv) | Amount (grams) | Amount (equiv) | Ratio Epoxy to PPE |
|---|---|---|---|---|---|
| SA90 | 778 | — | 297.86 | 0.3829 | 1.000:1 |
| EPON 1001F | — | 528 | 202.14 | 0.3829 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90 minutes as follows.

| Time (minutes) | Amount Added (Weight %) |
|---|---|
| 0 | 62 |
| 30 | 25 |
| 60 | 12 |
| 90 | 1 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 471 grams (94.2%).

Preparative Example 6

Poly(Arylene Ether)—Poly(Hydroxy Ether) Block Copolymer With 80 Weight Percent Poly(Arylene Ether) Blocks

TABLE 7

Reactant Amounts

| Reactant | HEW[1] (grams/equiv) | EEW[2] (grams/equiv) | Amount (grams) | Amount (equiv) | Ratio Epoxy to PPE |
|---|---|---|---|---|---|
| SA90 | 778 | — | 150.31 | 0.5116 | 1.000:1 |
| DER 317 | — | 199.3 | 199.3 | 0.5116 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90 minutes as follows.

| Time (minutes) | Amount Added (Weight %) |
|---|---|
| 0 | 67 |
| 30 | 26 |
| 60 | 6 |
| 90 | 1 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 466 grams (93.2%).

Preparative Example 7

Poly(Arylene Ether)—Poly(Hydroxy Ether) Block Copolymer with 46.5 Weight Percent Poly(Arylene Ether) Blocks

TABLE 8

Reactant Amounts

| Reactant | HEW[1] (grams/equiv) | EEW[2] (grams/equiv) | Amount (grams) | Amount (equiv) | Ratio Epoxy to PPE |
|---|---|---|---|---|---|
| PPE 0.117 IV | 1691 | — | 123.07 | 0.07278 | 1.000:1 |
| DER 667-E | — | 1744 | 126.93 | 0.07278 | |

[1]Hydroxyl equivalent weight.
[2]Epoxide equivalent weight.

Into a 1 liter three-necked round bottom flask equipped with a mechanical stirrer, thermocouple probe, powder funnel, and heating mantel, was added 250 milliliters cyclohexanone. The cyclohexanone was heated to 150° C. with stirring. The telechelic poly(arylene ether) was added and dissolved. Then 2.5 grams (0.0205 moles) of N,N-dimethylaminopyridine (DMAP) was added and dissolved. The 2,2-bis(4-hydroxyphenyl)propane-epichlorohydrin polymer was added in portions over 120 minutes as follows.

| Time (minutes) | Amount Added (Weight %) |
|---|---|
| 0 | 85.9 |
| 30 | 8.7 |
| 60 | 5.2 |
| 90 | 0.15 |
| 120 | 0.06 |

The solution was stirred for 7 hours at 150° C. The reaction mixture was cooled below 80° C. and diluted with 200 milliliters 2-butanone. The poly(arylene ether)-poly(hydroxy ether) block copolymer was isolated by precipitation in methanol, filtered, washed with methanol, and dried in a vacuum oven at 100° C. The yield was 237 grams (94.8%).

Preparative Example 8

Poly(Arylene Ether)—Poly(Hydroxy Ether) Block Copolymer with 48.6 Weight Percent Poly(Arylene Ether) Blocks

TABLE 9

Reactant Amounts

| Reactant | HEW[1] (grams/equiv) | EEW[2] (grams/equiv) | Amount (grams) | Amount (equiv) | Ratio Epoxy to PPE |
|---|---|---|---|---|---|
| PPE 0.065 IV | 627 | — | 121.5116 | 0.1938 | 1.000:1 |
| EPON 1002F | — | 663 | 128.4884 | 0.1938 | |

[1]Hydroxyl equivalent weight.
[2]Epoxide equivalent weight.

Into a 1 liter three-necked round bottom flask equipped with a mechanical stirrer, thermocouple probe, powder funnel, and heating mantel, was added 250 milliliters cyclohexanone. The cyclohexanone was heated to 150° C. with stirring. The telechelic poly(arylene ether) was added and dissolved. Then 2.5 grams (0.0205 moles) of N,N-dimethylaminopyridine (DMAP) was added and dissolved. The 2,2-bis(4-hydroxyphenyl)propane-epichlorohydrin polymer was added in portions over 120 minutes as follows.

| Time (minutes) | Amount Added (Weight %) |
|---|---|
| 0 | 89.5 |
| 30 | 7 |
| 60 | 3.3 |
| 90 | 0.1 |
| 120 | 0.1 |

The solution was stirred for 7 hours at 150° C. The reaction mixture was cooled below 80° C. and diluted with 200 milliliters 2-butanone. The poly(arylene ether)-poly(hydroxy ether) block copolymer was isolated by precipitation in methanol, filtered, washed with methanol, and dried in a vacuum oven at 100° C. The yield was 226 grams (90.4%).

Comparative Example 1

Poly(Arylene Ether)—Poly(Hydroxy Ether) Block Copolymer with 36 Weight Percent Poly(Arylene Ether) Blocks

TABLE 10

Reactant Amounts

| Reactant | HEW[1] (grams/ equiv) | EEW[2] (grams/equiv) | Amount (grams) | Amount (equiv) | Ratio Epoxy to PPE |
|---|---|---|---|---|---|
| SA90 | 778 | — | 181.45 | 0.2332 | 1.001:1 |
| DER 6155 | — | 1365 | 318.65 | 0.2334 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90 minutes as follows.

| Time (minutes) | Amount Added (Weight %) |
|---|---|
| 0 | 63 |
| 30 | 31 |
| 60 | 5 |
| 90 | 1 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 446 grams (89.2%).

Comparative Example 2

Poly(Arylene Ether)—Poly(Hydroxy Ether) Block Copolymer with 60 Weight Percent Poly(Arylene Ether) Blocks

TABLE 11

Reactant Amounts

| Reactant | HEW[1] (grams/equiv) | EEW[2] (grams/equiv) | Amount (grams) | Amount (equiv) | Ratio Epoxy to PPE |
|---|---|---|---|---|---|
| SA90 | 778 | — | 297.55 | 0.3825 | 1.002:1 |
| EPON 1001F | — | 528 | 202.45 | 0.3834 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The telechelic poly(arylene ether) was added and dissolved. Then 5.0 grams (0.0409 moles) of N,N-dimethylaminopyridine (DMAP) was added and dissolved. The 2,2-bis(4-hydroxyphenyl)propane-epichlorohydrin polymer was added in portions over 90 minutes as follows.

| Time (minutes) | Amount Added (Weight %) |
|---|---|
| 0 | 62 |
| 30 | 25 |
| 60 | 12 |
| 90 | 1 |

The solution was stirred for 7 hours at 150° C. The reaction mixture was cooled below 80° C. and diluted with 400 milliliters 2-butanone. The poly(arylene ether)-poly(hydroxy ether) block copolymer was isolated by precipitation in methanol, filtered, washed with methanol, and dried in a vacuum oven at 100° C. The yield was 443 grams (88.6%).

Comparative Example 3

Phenoxy Resin

Comparative Example 3 is INCHEMREZ Phenoxy Resin PKHH, a linear, thermoplastic phenoxy resin having an $M_n$ of 13,000, and available from InChem Corporation. PKHH is produced by copolymerization of 2,2-bis(4-hydroxyphenyl) propane and 2,2-bis(4-hydroxyphenyl)propane-epichlorohydrin polymer.

Characterization of Poly(Arylene Ether)—Poly(Hydroxy Ether) Block Copolymers

Properties of the poly(arylene ether)-poly(hydroxy ether) block copolymers of Preparative Examples 1-8 and Comparative Examples 1-3 are provided in Table 13. Glass transition temperature ($T_g$) was measured by differential scanning calorimetry (DSC) according to ASTM D3418-08. Number average molecular weight ($M_n$), weight average molecular weight ($M_w$), and polydispersity ($M_w/M_n$) were measured by gel permeation chromatography (GPC) using polystyrene standards. Density was measured at 23° C. according to ASTM D792-08. Flexural modulus and flexural stress at break (both expressed in megapascals) were measured at 23° C. according to ASTM D790-10, Method B, using samples having a depth of 3.2 millimeters and a width of 12.7 millimeters, a support span length of 10 centimeters (3.937 inches), and a crosshead motion rate of 1.35 millimeters/minute (0.053 inch/minute). Heat deflection temperature (expressed in degrees Centigrade), was measured according to ASTM D648-07, Method B, using a load of 1.82 megapascals and injection molded specimens having a width of 3.20 millimeters and a depth of 12.80 millimeters. For heat deflection testing, samples were immersed in silicone oil, which was initially at less than 30° C. Specimens were conditioned for 24 hours at 23° C. before testing.

Terminal epoxy group content was determined by proton nuclear magnetic resonance ($^1$H-NMR) spectroscopy using a Varian Mercury Plus 400 Megahertz $^1$H-NMR spectrometer. The amount of terminal epoxy groups was calculated from the height of the peaks corresponding to protons "a" and "h" in the structures below using the equation:

$$\text{Weight Percent Terminal Epoxy Groups} = h/(h+a) \times 100$$

The proton peak assignments corresponding to the labeled protons in the chemical structures below are given in Table 12. The limit of detection of terminal epoxy groups in this method is <0.05 weight percent. The terminal epoxy group content for Preparative Examples 1-6 and Comparative Examples 1-3 are provide in Table 13.

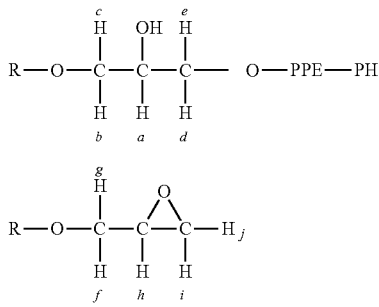

Terminal epoxy group

TABLE 12

Proton Chemical Shifts

| Proton | Chemical Shift (parts per million)[1] |
|---|---|
| a | 4.35 |
| e | 2.74 |
| f | 4.19 |
| g | 3.94 |
| h | 3.34 |
| i | 2.89 |

[1]Chloroform measured at 7.26 parts per million.

TABLE 13

Chemical and Physical Properties of Poly(arylene ether)-poly(hydroxy ether) Block Copolymers

| Example | PPE (wt %) | $T_g$ (° C.) | $M_n$ | $M_w$ | $M_n/M_w$ | Epoxy (wt %) | Density (g/cc) | Flex. Modulus (MPa) | Flex. Stress @ Break (MPa) | HDT @ 1.82 MPa (° C.) |
|---|---|---|---|---|---|---|---|---|---|---|
| Prep. Ex. 1 | 24 | 112 | 6456 | 20,720 | 3.21 | <0.05 | | | | |
| Prep. Ex. 2 | 30 | 117.4 | 5607 | 24,274 | 4.33 | <0.05 | 1.1565 | 2972 | 89 | 98 |
| Prep. Ex. 3 | 36 | 120 | 6873 | 36,440 | 5.30 | <0.05 | 1.1506 | 2988 | 87 | 101 |
| Prep. Ex. 4 | 54 | 132.4 | 6527 | 32,698 | 5.01 | <0.05 | 1.1352 | 2905 | 84 | 109 |
| Prep. Ex. 5 | 60 | 141 | 7324 | 41,928 | 5.72 | <0.05 | 1.1291 | 2956 | 80 | 124 |
| Prep. Ex. 6 | 80 | 155 | 6534 | 33,988 | 5.20 | <0.05 | — | — | — | — |
| Prep. Ex. 7 | 46.5 | 127 | 6511 | 27,919 | 3.8 | — | — | — | — | — |
| Prep. Ex. 8 | 48.6 | 126 | 5980 | 21.591 | 3.6 | — | — | — | — | — |
| Comp. Ex. 1 | 36 | — | 6062 | 32,796 | 5.41 | 0.09 | — | — | — | — |
| Comp. Ex. 2 | — | — | 6441 | 37,835 | 5.87 | 0.19 | — | — | — | — |
| Comp. Ex. 3 | 0 | 90 | 8300 | 46,738 | 5.63 | <0.05 | 1.1774 | 2761 | 95 | 77 |

Example 1

Extrusion of Poly(Arylene Ether)—Poly(Hydroxy Ether) Block Copolymers

This Example shows that the poly(arylene ether)-poly(hydroxy ether) block copolymers of the present invention can be extruded. Preparative Examples 2 and 3 were extruded using a Coperion, Type ZSK 18 millimeter extruder. Preparative Examples 4 and 5 were extruded using a C. W. Brabender, Prep Center (Drive), Type D52T, No. 86/SAF-9P extruder. The extrusion conditions are summarized in Table 14.

TABLE 14

| | | | Extrusion Conditions | | | | | | | | |
|---|---|---|---|---|---|---|---|---|---|---|---|
| Example | PPE Block (wt %) | Extruder | Zone 1 (° C.) | Zone 2 (° C.) | Zone 3 (° C.) | Zone 4 (° C.) | Zone 5 (° C.) | Zone 6 (° C.) | Die (° C.) | Nozzle (° C.) | RPM | Torque |
| Prep. Ex. 2 | 30 | ZSK 18 mm | 160 | 190 | 210 | 220 | 230 | 230 | 230 | 252 | 250 | 69% |
| Prep. Ex. 3 | 36 | ZSK 18 mm | 160 | 200 | 210 | 230 | 230 | 230 | 230 | 252 | 275 | 75% |
| Prep. Ex. 4 | 54 | Brabender | 200 | 230 | 230 | 230 | 230 | 230 | 230 | 252 | 120 | — |
| Prep. Ex. 5 | 60 | Brabender | 200 | 230 | 230 | 230 | 230 | 230 | 230 | 260 | 110 | — |

Example 2

Injection Molding of Poly(Arylene Ether)—Poly(Hydroxy Ether) Block Copolymers This Example shows that the poly(arylene ether)-poly(hydroxy ether) block copolymers of the present invention can be injection molded. Comparative Example 1 and Preparative Examples 2, 3, 4, and 5 were injection molded using a Demag Plastic Group, model Extra 40-80, injection molding machine. The molding conditions are summarized in Table 15.

TABLE 15

Injection Molding Conditions

| Example | PPE Block (wt %) | Zone 1 (° C.) | Zone 2 (° C.) | Zone 3 (° C.) | Mold (° C.) | Injection Pressure (psi) |
|---|---|---|---|---|---|---|
| Comp. Ex. 3 | 0 | 232 | 232 | 232 | 54 | 800 |
| Prep. Ex. 2 | 30 | 246 | 246 | 246 | 54 | 1200 |
| Prep. Ex. 3 | 36 | 246 | 246 | 246 | 66 | 1200 |
| Prep. Ex. 4 | 54 | 246 | 246 | 246 | 78 | 1200 |
| Prep. Ex. 5 | 60 | 254 | 254 | 254 | 66 | 1300 |

Example 3

Glass Transition Temperatures of Poly(Arylene Ether)—Poly(Hydroxy Ether) Block Copolymers The poly(arylene ether)-poly(hydroxy ether) block copolymers of Preparative Examples 1-8 were characterized by Differential Scanning calorimetry (DSC). They each exhibited a single glass transition temperatures ($T_g$). FIG. 1 is a bar chart depicting $T_g$ as a function of weight percent poly (arylene ether) block in the poly(arylene ether)-poly(hydroxy ether) block copolymer. As can be seen from FIG. 1, the glass transition temperature of the poly(arylene ether)-poly(hydroxy ether) block copolymer increases with increased amount of telechelic poly(arylene ether) block.

The glass transition temperature of the poly(arylene ether)-poly(hydroxy ether) block copolymers are a function of the glass transition temperature of the poly(arylene ether) and poly(hydroxy ether) blocks and of the weight or volume fraction of its components. The glass transition temperatures of the poly(arylene ether)-poly(hydroxy ether) block copolymers were calculated from the glass transition temperature of telechelic poly(2,6-dimethyl-1,4-phenylene ether) (150° C.). Since epoxy resins are low molecular weight materials, glass transition temperatures are difficult to detect or are non-existent. Therefore the glass transition temperature of high molecular weight 2,2-bis(4-hydroxyphenyl)propane-epichlorohydrin polymer (phenoxy resin) was used (90° C.). In addition to calculations of glass transition temperature using weight fraction and volume fraction, the Fox equation was used. The equations for calculating glass transition temperature are given below:

Equation for calculating $T_g$ via weight fraction:

$$T_g = W_1 T_{g1} + W_2 T_{g2}$$

Equation for calculating $T_g$ via volume fraction:

$$T_g = V_1 T_{g1} + V_2 T_{g2}$$

Fox equation:

$$\frac{1}{T_g} = \frac{W_1}{T_{g1}} + \frac{W_2}{T_{g2}}$$

Figure 2:
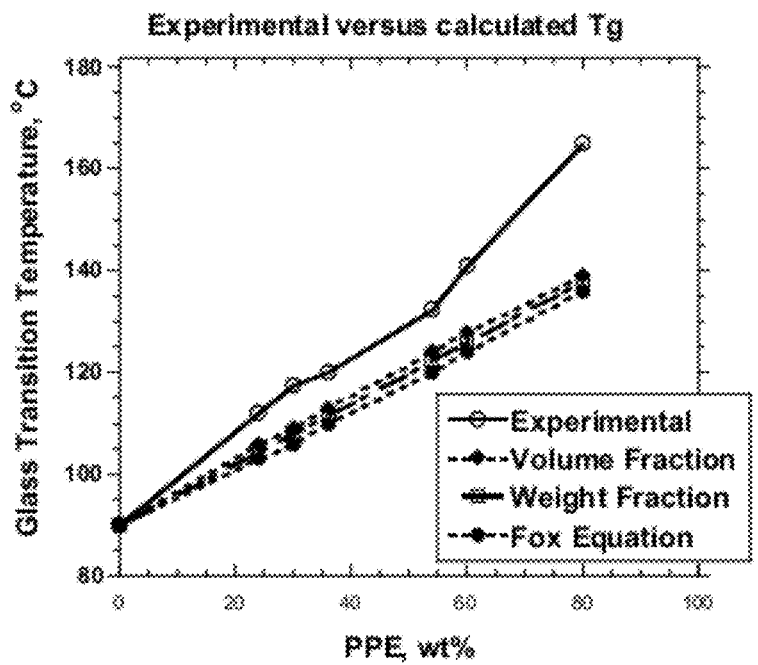
FIG. 2 is a plot of $T_g$ as a function of weight percent poly(arylene ether) block in the poly(arylene ether)-poly(hydroxy ether) block copolymer. Theoretical values of $T_g$ based on the Fox equation, volume fraction $T_g$, and weight fraction $T_g$, and experimental values of $T_g$ are plotted.

$T_g$=glass transition temperature for a poly(arylene ether)-poly(hydroxy ether) block copolymer
$T_{g1}$=glass transition temperature of telechelic poly(arylene ether)
$T_{g2}$=glass transition temperature of 2,2-bis(4-hydroxyphenyl)propane-epichlorohydrin polymer (phenoxy resin)
$W_1$=weight fraction of telechelic poly(arylene ether)
$W_2$=weight fraction of 2,2-bis(4-hydroxyphenyl)propane-epichlorohydrin polymer
$V_1$=volume fraction of telechelic poly(arylene ether)
$V2$=volume fraction of 2,2-bis(4-hydroxyphenyl)propane-epichlorohydrin polymer The experimental and calculated glass transition temperatures are compared in FIG. 2. The poly(arylene ether)-poly(hydroxy ether) block copolymers of Preparative Examples 1-6 consistently exhibit higher glass transition temperatures than the predicted values.

Example 4

Thermal Stability of Poly(Arylene Ether)—Poly(Hydroxy Ether) Block Copolymers The thermal stability of the poly(arylene ether)-poly(hydroxy ether) block copolymers was assessed by measuring the solubility in toluene of test samples aged for four hours at 200° C. Test samples of 5 grams were weighed out into aluminum pans, and placed in a vacuum oven at 200° C. and 160 millimeters mercury. After 4 hours, the samples were removed from the oven and their solubility in 25 grams of toluene (16.67 weight percent solutions) was assessed. The terminal epoxy group content, was determined by $^1$H-NMR spectroscopy, as set forth above. The heating aging results and terminal epoxy group content for Preparative Examples 1-6 and Comparative Examples 1-3 are summarized in Table 16.

As can be seen from Table 16, Preparative Examples 1-6 and Comparative Example 3, which had no terminal epoxy groups (within the limit of detection of the method), were soluble in toluene after heat aging. Comparative Examples 1 and 2, which had 0.9 and 1.9 weight percent terminal epoxy groups, on the other hand, were insoluble in toluene after heat aging. Without being bound by theory, applicants believe that the epoxy groups can react with internal and terminal hydroxyl groups in the poly(arylene ether)-poly(hydroxy ether) block copolymers. These reactions result in chain extension and cross-linking, which transforms the poly (arylene ether)-poly(hydroxy ether) block copolymers into insoluble materials.

This heating aging test is a screening test for the melt stability of poly(arylene ether)-poly(hydroxy ether) block copolymers. If the poly(arylene ether)-poly(hydroxy ether) block copolymer is thermally unstable in this test, it is expected to be unsuitable for extrusion and injection molding. Thus Preparative Examples 1-5, having less than 0.05 weight percent epoxy groups, were thermally stable in this screening test, and were likewise successfully extruded (Example 1) and injection molded (Example 2). In contrast, the poly (arylene ether)-poly(hydroxy ether) block copolymers of Comparative Examples 1 and 2, which have 0.09 and 0.19 weight percent terminal epoxy groups, respectfully, are thermally unstable in this test, and therefore are not suitable for extrusion or injection molding.

TABLE 16

Effect of Terminal Epoxy Group Content on Thermal Stability

| Examples | PPE Content (wt %) | Ratio Epoxy to PPE | Terminal Epoxy Groups (wt %) | Solubility in Toluene After 4 hrs. at 200° C. |
|---|---|---|---|---|
| Prep. Ex. 1 | 24 | 1.000:1 | <0.05 | Soluble |
| Prep. Ex. 2 | 30 | 1.000:1 | <0.05 | Soluble |
| Prep. Ex. 3 | 36 | 1.000:1 | <0.05 | Soluble |
| Prep. Ex. 4 | 54 | 0.9997:1 | <0.05 | Soluble |
| Prep. Ex. 5 | 60 | 1.000:1 | <0.05 | Soluble |
| Prep. Ex. 6 | 80 | 1.000:1 | <0.05 | Soluble |
| Comp. Ex. 1 | 36 | 1.001:1 | 0.09 | Insoluble |
| Comp. Ex. 2 | 60 | 1.002:1 | 0.19 | Insoluble |
| Comp. Ex. 3 | 0 | — | — | Soluble |

Example 5

Compatibility of Poly(Arylene Ether)—Poly(Hydroxy Ether) Block Copolymers with Polystyrene The effect of increasing amounts of poly(arylene ether) block in poly(arylene ether)-poly(hydroxy ether) block copolymers on compatibility with non-polar polymers was examined. The amount of poly(arylene ether) block varied from 0 to 80 weight percent. Commercially available 2,2-bis (4-hydroxyphenyl)propane-epichlorohydrin polymer, known as phenoxy resin, was used as a control having zero poly(arylene ether) block content. It was obtained as Phenoxy Resin PKHH from InChem Corporation.

Polystyrene solution blends were prepared by dissolving 3.0 grams of polystyrene and 3.0 grams of poly(arylene ether)-poly(hydroxy ether) block copolymer having different amounts of poly(arylene ether) block or phenoxy resin in 25 grams of chloroform. After dissolution of the polymers, the solutions separated into two liquid phases upon standing. The phases were separated, the chloroform was evaporated, and the residues were analyzed by $^1$H-NMR spectroscopy. The results are shown graphically in FIGS. 3 and 4. In the figures, "Polyhydroxy ether" denotes poly(arylene ether)-poly(hydroxy ether) block copolymer.

As can be seen from FIG. 3, the top phases were rich in polystyrene. However the amount of poly(arylene ether)-poly (hydroxy ether) block copolymer in the top phase increased with increasing amount of poly(arylene ether) block in the poly(arylene ether)-poly(hydroxy ether) block copolymers. As can be seen from FIG. 4, the bottom phases were rich in poly(arylene ether)-poly(hydroxy ether) block copolymer or phenoxy resin. However, the amount of polystyrene in the bottom phase increased with increasing amounts poly (arylene ether) block in the poly(arylene ether)-poly(hydroxy ether) block copolymers. It is clear from these results that the higher the amount of poly(arylene ether) blocks in the poly (arylene ether)-poly(hydroxy ether) block copolymers, the higher is the compatibility of the poly(arylene ether)-poly (hydroxy ether) block copolymer with polystyrene.

Example 6

Compatibility of Poly(Arylene Ether)—Poly(Hydroxy Ether) Block Copolymers with Poly(Arylene Ether)

Poly(arylene ether) solution blends were prepared by dissolving 3.0 grams of poly(arylene ether) having an intrinsic viscosity 0.40 deciliters per gram and 3.0 grams of 3.0 grams of poly(arylene ether)-poly(hydroxy ether) block copolymers having different amounts of telechelic poly(arylene ether) block in 25 grams of chloroform. After dissolution of the polymers, most of the solutions separated into two liquid phases upon standing. However, the solution made from poly (arylene ether)-poly(hydroxy ether) block copolymer having 80 weight percent poly(arylene ether) block exhibited a single phase. The phases were separated when present, the chloroform was evaporated, and the residues were analyzed by $^1$H-NMR spectroscopy. The results are shown graphically in FIGS. 5 and 6. In Figures, 5 and 6, "Polyhydroxy ether" denotes poly(arylene ether)-poly(hydroxy ether) block copolymer.

As can be seen from FIG. 5, the top phases were rich in poly(arylene ether)-poly(hydroxy ether) block copolymer or phenoxy resin. However, the amount of poly(arylene ether) in the top phase increased with increasing amounts of poly (arylene ether) blocks in the poly(arylene ether)-poly(hydroxy ether) block copolymers. As can be seen from FIG. 6, the bottom phases were rich in poly(arylene ether). However, the amount of poly(arylene ether)-poly(hydroxy ether) block copolymer increased with increasing amounts poly(arylene ether) blocks in the poly(arylene ether)-poly(hydroxy ether) block copolymers. It is clear from these results that the higher the amount of poly(arylene ether) blocks in poly(arylene ether)-poly(hydroxy ether) block copolymers, the higher is its compatibility with poly(arylene ether).

Example 7

Moisture Uptake

Figure 7:
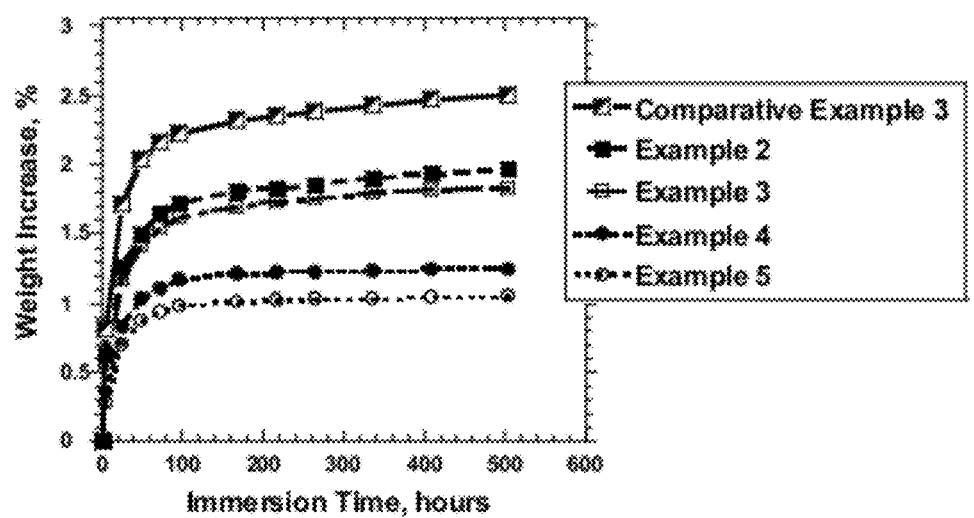
FIG. 7 is a plot of moisture uptake as a function of 80° C. water immersion time for phenoxy resin and for poly(arylene ether) poly(hydroxy ether) block copolymers having increasing poly(arylene ether) content.

Moisture uptake for Examples 2-5 was compared to phenoxy resin (Comparative Example 3) using the following procedure. Injection molded samples were dried in a vacuum oven for 60 hours at 75° C. and 25 inches of mercury. The dried samples were weighed and then placed in deionized water at 80° C. The samples were removed at certain time intervals, the surface moisture was wiped off, the samples were weighed, and then they were retuned to the water. The results are shown in FIG. 7. As can be seen from FIG. 7, the phenoxy resin has the highest moisture uptake. All of the poly(arylene ether) poly(hydroxy ether) block copolymers have lower moisture uptake, and the moisture uptake decreases with increasing poly(arylene ether) block content.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A poly(arylene ether)-poly(hydroxy ether) block copolymer comprising:

at least one poly(hydroxy ether) block having the structure:

—B-[A-B]$_n$- wherein A is a residue of structure

—O-[G$^1$]$_t$-[E]$_s$-[G$^1$]$_u$-O— wherein each G$^1$ is independently at each occurrence a C$_6$-C$_{20}$ aromatic radical, and E is independently at each occurrence a direct bond, or a structure selected from the group consisting of

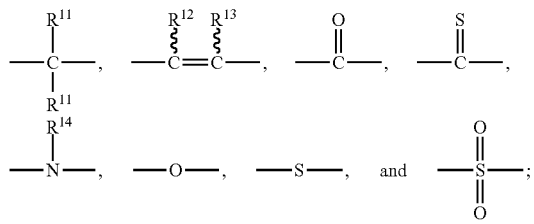

wherein each occurrence of R$^{11}$-R$^{14}$ is independently hydrogen or C$_1$-C$_{12}$ hydrocarbyl, s is 0 or 1, and t and u are each independently 1 to 10; and wherein B is a residue of structure

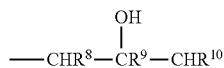

wherein R$^8$ to R$^{10}$ are each independently hydrogen, or C$_1$-C$_{12}$ hydrocarbyl; and wherein n is about 1 to about 60; and at least one poly(arylene ether) block;

wherein the mole ratio of poly(hydroxy ether) blocks to poly(arylene ether) blocks is 0.95:1 to 1.00:1.

2. The poly(arylene ether)-poly(hydroxy ether) block copolymer of claim 1, wherein the poly(arylene ether)-poly(hydroxy ether) block copolymer has a number average molecular weight of about 5,000 to about 50,000 atomic mass units.

3. The poly(arylene ether)-poly(hydroxy ether) block copolymer of claim 1, wherein the poly(arylene ether)-poly(hydroxy ether) block copolymer has less than 0.09 weight percent of terminal epoxy groups.

4. The poly(arylene ether)-poly(hydroxy ether) block copolymer of claim 1, comprising about 1 to about 99 weight percent of the at least one poly(hydroxy ether) block; and about 1 to about 99 weight percent of the at least one poly(arylene ether) block.

5. The poly(arylene ether)-poly(hydroxy ether) block copolymer of claim 1, wherein A is derived from a dihydroxy aromatic compound selected from the group consisting of 2,2-bis(4-hydroxyphenyl)propane (bisphenol A), 2,2-bis(3,5-dichloro-4-hydroxyphenyl)propane (tetrachloro bisphenol A), 2,2-bis(3,5-dibromo-4-hydroxyphenyl)propane (tetrabromo bisphenol A), bis(4-hydroxyphenyl)methane (bisphenol F), 1,1-bis(4-hydroxyphenyl)ethane (bisphenol ACP), bis(4-hydroxyphenyl)sulfone (bisphenol S), 2,2-bis(4-hydroxycyclohexyl)propane (hydrogenated bisphenol A), 1,5-dihydroxynapthalene, 2,2',6,6'-tetramethyl-4,4'-dihydroxybiphenyl, and combinations thereof.

6. The poly(arylene ether)-poly(hydroxy ether) block copolymer of claim 1, wherein B is derived from an epihalohydrin selected from the group consisting of epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and combinations thereof.

7. The poly(arylene ether)-poly(hydroxy ether) block copolymer of claim 1, wherein the at least one poly(hydroxy ether) block has the structure

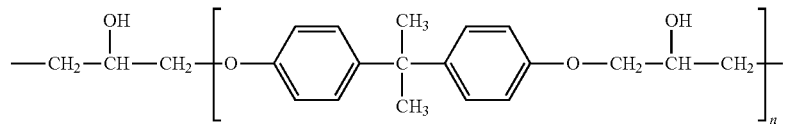

wherein n is about 1 to about 60.

8. The poly(arylene ether)-poly(hydroxy ether) block copolymer of claim 1, wherein the at least one poly(arylene ether) block has the structure

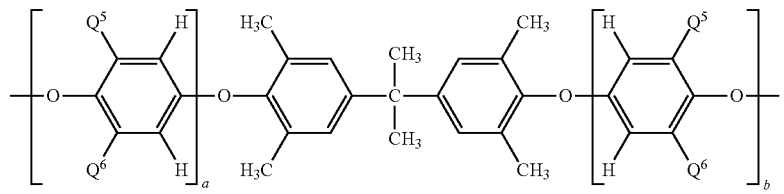

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and
wherein the at least one poly(hydroxy ether) block has the structure

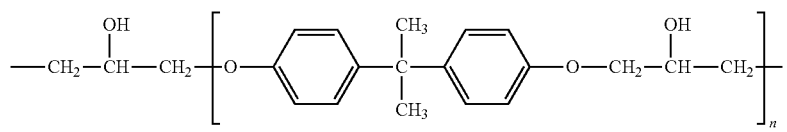

wherein n is about 1 to about 60.

9. A poly(arylene ether)-poly(hydroxy ether) block copolymer comprising:
at least one poly(hydroxy ether) block having the structure —B-[A-B]$_n$- wherein A is a residue of structure

—O-[G$^1$]$_t$-[E]$_s$-[G$^1$]$_u$-O— wherein each G$^1$ is independently at each occurrence a $C_6$-$C_{20}$ aromatic radical, and E is independently at each occurrence a direct bond, or a structure selected from the group consisting of

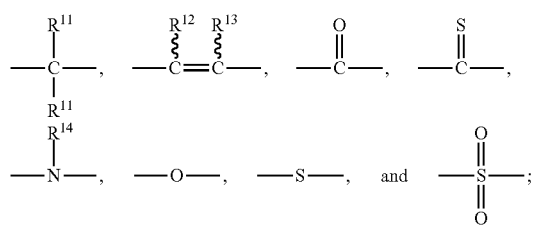

wherein each occurrence of R$^{11}$-R$^{14}$ is independently hydrogen a $C_1$-$C_{12}$ hydrocarbyl, s is 0 or 1, and t and u are each independently 1 to 10; and wherein B is a residue of structure

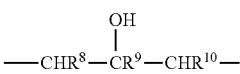

wherein R$^8$ to R$^{10}$ are each independently hydrogen, or $C_1$-$C_{12}$ hydrocarbyl; and wherein n is about 1 to about 60; and
at least one poly(arylene ether) block,
wherein the poly(arylene ether)-poly(hydroxy ether) block copolymer has a number average molecular weight of about 5,000 to about 50,000 atomic mass units.

10. The poly(arylene ether)-poly(hydroxy ether) block copolymer of claim 9, wherein the poly(arylene ether)-poly(hydroxy ether) block copolymer has less than 0.09 weight percent of terminal epoxy groups, based on the weight of the poly(arylene ether)-poly(hydroxy ether) block copolymer.

11. The poly(arylene ether)-poly(hydroxy ether) block copolymer of claim 9, comprising
about 1 to about 99 weight percent of the at least one poly(hydroxy ether) block, and
about 1 to about 99 weight percent of the at least one poly(arylene ether) block, based on the weight of the poly(arylene ether)-poly(hydroxy ether) block copolymer.

12. The poly(arylene ether)-poly(hydroxy ether) block copolymer of claim 9, wherein the at least one poly(hydroxy ether) block has the structure

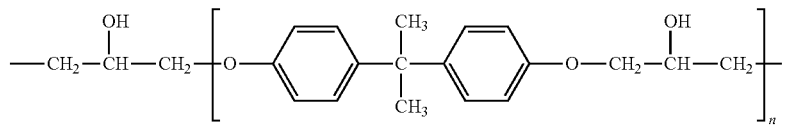

wherein n is about 1 to about 60.

13. The poly(arylene ether)-poly(hydroxy ether) block copolymer of claim 9,
wherein the at least one poly(arylene ether) block comprises the structure

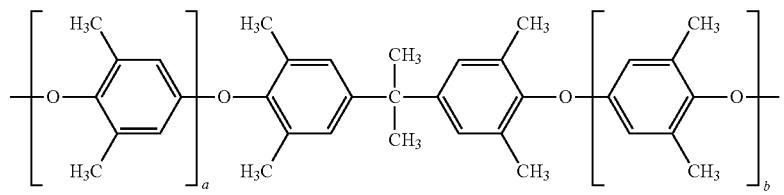

wherein a and b are each independently 0 to 50, provided that the sum of a and b is at least 3; and wherein the at least one poly(hydroxy ether) block has the structure

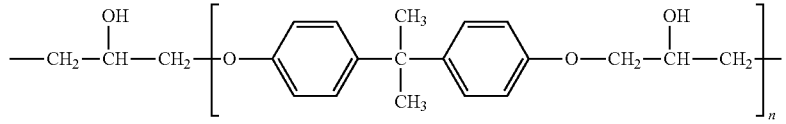

wherein n is about 1 to about 60.

14. A composition comprising
the poly(arylene ether)-poly(hydroxy ether) block copolymer of claim 1, and
a non-polar polymer selected from the group consisting of poly(arylene ether)s, poly(alkenyl aromatic)s, block copolymers of alkenyl aromatic compounds and conjugated dienes, hydrogenated block copolymers of alkenyl aromatic compounds and conjugated dienes, and combinations thereof.

15. The composition of claim 14, wherein the non-polar polymer comprises a polystyrene.

16. The composition of claim 15, comprising about 1 to about 15 weight percent of the poly(arylene ether)-poly(hydroxy ether) block copolymer, and about 85 to about 99 weight percent of the polystyrene, based on the total weight of the poly(arylene ether)-poly(hydroxy ether) block copolymer and the polystyrene.

17. The composition of claim 15, comprising about 1 to about 15 weight percent of the polystyrene, and about 85 to about 99 weight percent of the poly(arylene ether)-poly(hydroxy ether) block copolymer, based on the total weight of the polystyrene and the poly(arylene ether)-poly(hydroxy ether) block copolymer.

18. The composition of claim 15, further comprising a polar polymer selected from the group consisting of polyesters, poly(ethylene-vinyl acetate), poly(ethylene-ethyl acrylate), poly(vinyl acetate), poly(vinyl alcohol), and combinations thereof.

19. The composition of claim 14, further comprising a polyester selected from the group consisting of poly(ethylene terephthalate), poly(trimethylene terephthalate), poly(butylene terephthalate), poly(lactic acid), and combinations thereof.

20. The composition of claim 14, wherein the non-polar polymer comprises a poly(arylene ether).

21. The composition of claim 20, comprising about 1 to about 50 weight percent of the poly(arylene ether), and about 50 to about 99 weight percent of the poly(arylene ether)-poly(hydroxy ether) block copolymer, based on the total weight of the poly(arylene ether) and the poly(arylene ether)-poly(hydroxy ether) block copolymer.

22. The composition of claim 20, comprising about 10 to about 50 weight percent of the poly(arylene ether)-poly(hydroxy ether) block copolymer, and about 50 to about 90 weight percent of the poly(arylene ether), based on the total weight of the poly(arylene ether)-poly(hydroxy ether) block copolymer and the poly(arylene ether).

23. The composition of claim 20, further comprising a polar polymer selected from the group consisting of polyesters, poly(ethylene-vinyl acetate), poly(ethylene-ethyl acrylate), poly(vinyl acetate), poly(vinyl alcohol), and combinations thereof.

24. The composition of claim 20, further comprising a polyester selected from the group consisting of poly(ethylene terephthalate), poly(trimethylene terephthalate), poly(butylene terephthalate), poly(lactic acid), and combinations thereof.

25. The composition of claim 14, further comprising glass fibers.

26. The composition of claim 25, wherein the non-polar polymer comprises a polystyrene.

27. A method of making a poly(arylene ether)-poly(hydroxy ether) block copolymer, comprising:
reacting a telechelic poly(arylene ether) having terminal hydroxyl groups with a telechelic poly(hydroxy ether) epoxy resin having terminal epoxy groups;
wherein the telechelic poly(hydroxy ether) epoxy resin having terminal epoxy groups has the structure

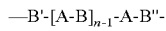

wherein A is a residue of structure

wherein each $G^1$ is independently at each occurrence a $C_6$-$C_{20}$ aromatic radical, and E is independently at each occurrence a direct bond, or a structure selected from the group consisting of

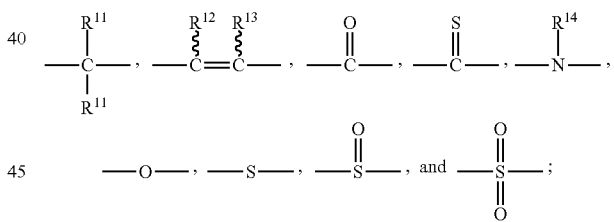

wherein each occurrence of $R^{11}$-$R^{14}$ is independently hydrogen or $C_1$-$C_{12}$ hydrocarbyl, s is 0 or 1, and t and u are each independently 1 to 10; wherein B is a residue having the structure

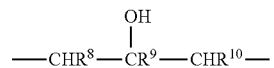

wherein $R^8$ to $R^{10}$ are each independently hydrogen, or $C_1$-$C_{12}$ hydrocarbyl; wherein B' is a residue having the structure

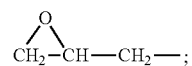

wherein B" is a residue having the structure

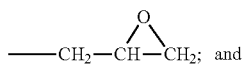 and wherein n is about 1 to about 60;
wherein the mole ratio of the telechelic poly(hydroxy ether) to the telechelic poly(arylene ether) is 0.95:1 to 1.00:1.

28. The method of claim 27, wherein said telechelic poly(hydroxyl ether) is added to said telechelic poly(arylene ether) in portions over a period of about 15 to about 300 minutes.

29. A poly(arylene ether)-poly(hydroxy ether) block copolymer prepared by the method of claim 27.

30. A method for forming a composition comprising melt-blending or melt-kneading the components of the composition of claim 14.

31. An article comprising the poly(arylene ether)-poly(hydroxy ether) block copolymer of claim 1.

32. A method for forming an article comprising shaping the poly(arylene ether)-poly(hydroxy ether) block copolymer of claim 1 by extrusion, thermoforming, or molding.

* * * * *